United States Patent
Ouderkirk et al.

(10) Patent No.: US 7,362,943 B2
(45) Date of Patent: Apr. 22, 2008

(54) POLYMERIC PHOTONIC CRYSTALS WITH CO-CONTINUOUS PHASES

(75) Inventors: Andrew J. Ouderkirk, Woodbury, MN (US); Olester Benson, Jr., Woodbury, MN (US); Robert L. Brott, Woodbury, MN (US); Patrick R. Fleming, Lake Elmo, MN (US); Catherine A. Leatherdale, St. Paul, MN (US); Terence D. Neavin, St. Paul, MN (US); Diane North, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/068,313

(22) Filed: Feb. 28, 2005

(65) Prior Publication Data

US 2006/0193593 A1     Aug. 31, 2006

(51) Int. Cl.
G02B 6/00 (2006.01)
G02B 6/10 (2006.01)

(52) U.S. Cl. ...................... 385/147; 385/131
(58) Field of Classification Search ............ 385/123, 385/125, 129–132, 147
See application file for complete search history.

(56) References Cited

U.S. PATENT DOCUMENTS

| | | | |
|---|---|---|---|
| 2,403,731 A | 7/1946 | MacNeille | 359/488 |
| 2,604,817 A | 7/1952 | Schupp, Jr. | 359/500 |
| 2,687,673 A | 8/1954 | Boone | |
| 4,019,844 A | 4/1977 | Ogasawara et al. | 425/131.5 |
| 4,357,389 A | 11/1982 | Satoh et al. | |
| 4,477,522 A | 10/1984 | Sheehan | 428/359 |
| 4,560,411 A | 12/1985 | Melchior | 524/8 |
| 4,963,151 A | 10/1990 | Ducheyne et al. | 623/16 |
| 5,047,288 A | 9/1991 | Hoshiro et al. | 428/290 |
| 5,059,482 A | 10/1991 | Kawamoto et al. | 428/373 |
| 5,217,794 A | 6/1993 | Schrenk | 428/220 |
| 5,251,065 A | 10/1993 | Uetsuki | 359/454 |
| 5,269,995 A | 12/1993 | Ramanathan et al. | 264/171 |

(Continued)

FOREIGN PATENT DOCUMENTS

JP      5-113606      5/1993

(Continued)

OTHER PUBLICATIONS

T. F. Cook, "Bicomponent Fibers", Handbook of Fiber Science and Technology: vol. 3, High Technology Fibers, Part D, Marcel Dekker, Inc., ISBN 0-8247-9470-2, 1996, pp. 247-280.

(Continued)

Primary Examiner—Kevin S. Wood
(74) Attorney, Agent, or Firm—Jay R. Pralle

(57) ABSTRACT

An optical element is formed by co-extruding to have an arrangement of polymer scattering fibers within a polymer matrix. The scattering fibers lie substantially parallel to a first axis. The scattering fibers are arranged at positions across the cross-section of the polymer matrix to scatter light transversely incident on the optical element in a direction substantially orthogonal to the first axis. The positions of the scattering fibers across the cross-section of the optical element may be selected so as to form a two-dimensional photonic crystal structure for light transversely incident on the optical element.

30 Claims, 16 Drawing Sheets

U.S. PATENT DOCUMENTS

| | | | |
|---|---|---|---|
| 5,316,703 A | 5/1994 | Schrenk | |
| 5,389,324 A | 2/1995 | Lewis et al. | 264/171 |
| 5,444,570 A | 8/1995 | Uetsuki | 359/483 |
| 5,612,820 A | 3/1997 | Schrenk et al. | 359/498 |
| 5,629,055 A | 5/1997 | Revol et al. | |
| 5,751,388 A | 5/1998 | Larson | 349/96 |
| 5,753,277 A | 5/1998 | Kikutani et al. | 425/461 |
| 5,783,120 A | 7/1998 | Ouderkirk et al. | |
| 5,807,458 A | 9/1998 | Sanders et al. | 156/276 |
| 5,825,543 A | 10/1998 | Ouderkirk et al. | |
| 5,877,829 A | 3/1999 | Okamoto et al. | |
| 5,882,774 A | 3/1999 | Jonza et al. | 428/212 |
| 5,999,239 A | 12/1999 | Larson | 349/96 |
| 6,075,915 A * | 6/2000 | Koops et al. | 385/125 |
| 6,111,696 A | 8/2000 | Allen et al. | 359/495 |
| 6,139,626 A | 10/2000 | Norris et al. | |
| 6,141,149 A | 10/2000 | Carlson et al. | 359/500 |
| 6,239,907 B1 | 5/2001 | Allen et al. | 359/443 |
| 6,243,521 B1 | 6/2001 | Owaki et al. | 385/123 |
| 6,301,421 B1 * | 10/2001 | Wickham et al. | 385/126 |
| 6,310,671 B1 | 10/2001 | Larson | 349/96 |
| 6,326,094 B1 | 12/2001 | Asano et al. | 428/913 |
| 6,335,094 B1 | 1/2002 | Owaki et al. | 428/374 |
| 6,387,488 B1 | 5/2002 | Kumazawa et al. | 428/359 |
| 6,430,348 B1 | 8/2002 | Asano et al. | 385/131 |
| 6,433,919 B1 * | 8/2002 | Chowdhury et al. | 359/332 |
| 6,498,869 B1 | 12/2002 | Yao | 359/350 |
| 6,529,676 B2 | 3/2003 | Eggleton et al. | |
| 6,542,681 B2 * | 4/2003 | Broeng et al. | 385/123 |
| 6,542,682 B2 * | 4/2003 | Cotteverte et al. | 385/125 |
| 6,577,446 B2 | 6/2003 | Kumazawa et al. | 359/577 |
| 6,674,949 B2 * | 1/2004 | Allan et al. | 385/129 |
| 6,813,399 B2 * | 11/2004 | Hamada | 385/11 |
| 6,876,796 B2 | 4/2005 | Garito et al. | |
| 7,082,147 B2 | 7/2006 | Spoonhower et al. | |
| 2001/0012149 A1 | 8/2001 | Lin et al. | |
| 2002/0130988 A1 | 9/2002 | Crawford et al. | 349/86 |
| 2002/0131737 A1 * | 9/2002 | Broeng et al. | 385/123 |
| 2002/0135880 A1 | 9/2002 | Fink et al. | |
| 2002/0154403 A1 | 10/2002 | Trotter, Jr. | 359/484 |
| 2002/0155592 A1 | 10/2002 | Kelleher et al. | |
| 2002/0181911 A1 | 12/2002 | Wadsworth et al. | 385/125 |
| 2003/0031438 A1 | 2/2003 | Kambe et al. | |
| 2003/0031846 A1 | 2/2003 | Kumazawa et al. | 428/212 |
| 2003/0035972 A1 | 2/2003 | Hanson et al. | 428/480 |
| 2003/0218704 A1 | 11/2003 | Lee et al. | |
| 2004/0012118 A1 | 1/2004 | Perez et al. | 264/257 |
| 2004/0012855 A1 | 1/2004 | Allen et al. | 359/490 |
| 2004/0031435 A1 | 2/2004 | Park | |
| 2004/0052484 A1 | 3/2004 | Broeng et al. | |
| 2004/0096172 A1 | 5/2004 | Bongrand et al. | 385/123 |
| 2004/0126592 A1 | 7/2004 | Shibahara et al. | 428/441 |
| 2004/0132867 A1 | 7/2004 | Shibahara et al. | 523/466 |
| 2004/0175084 A1 | 9/2004 | Broeng et al. | 385/125 |
| 2004/0179803 A1 | 9/2004 | Bourelle | 385/129 |
| 2004/0223715 A1 | 11/2004 | Benoit et al. | 385/123 |
| 2005/0147366 A1 | 7/2005 | Large et al. | |
| 2005/0201655 A1 | 9/2005 | Ellwood, Jr. | |
| 2005/0201715 A1 | 9/2005 | Ellwood, Jr. | |
| 2006/0029343 A1 | 2/2006 | Farroni et al. | |
| 2006/0139948 A1 | 6/2006 | Huck et al. | |
| 2007/0042168 A1 | 2/2007 | Harada et al. | |

FOREIGN PATENT DOCUMENTS

| | | |
|---|---|---|
| JP | 09311205 | 2/1997 |
| JP | 2000-52399 | 2/2000 |
| JP | 2000239541 | 9/2000 |
| JP | 2001031774 | 2/2001 |
| JP | 2005-133028 | 5/2005 |
| WO | WO97/32224 | 9/1997 |
| WO | WO99/64904 | 12/1999 |
| WO | WO 02/48757 | 6/2002 |
| WO | WO 03/062909 | 7/2003 |
| WO | WO 2004/046777 | 6/2004 |

OTHER PUBLICATIONS

A. Paul, *Chemistry of Glasses*, 2nd Edition, Chapman and Hall, 1990, pp. 41-49.

W.D. Kingery, et al., Massachusetts Institute of Technology, *Introduction to Ceramics*, 2nd Edition, John Wiley and Sons, 1976, pp. 368-374.

Dugan et al., "Synthetic Split Microfiber Technology for Filtration", Fiber Innovation Technologies and Edward C. Homonoff & Associates, LLC, Filtration 2000 Conference, Philadelphia, PA, Nov. 2000, 9 pgs.

"King and Company—Glossary of Fabric and Textile Jargon" <http://www.kingandco.com/glossary/>, printed from internet on Oct. 1, 2003, 6 pgs.

The Texemart Times, Texemart News—Features Section, "Recent Advancements in Man-made Textiles: Microfibres", <http://www.texemart.com/news/narchive/archivedec5.asp>, Printed from the internet on Oct. 1, 2003, p. 3.

Hagewood et al., Hills Inc., Barrier Fabrics of Spunbond Specialty Fibers for Medica . . . , "Production of Sub-micron Fibers in Non-Woven Fabric", <http://www.hillsinc.net/submicron%20.shtml>, printed from the internet on Oct. 1, 2003, p. 7.

Ouderkirk et al., U.S. Appl. No. 11/068,157, "Reflective Polarizers Containing Polymer Fibers", filed Feb. 28, 2005.

Fleming et al., U.S. Appl. No. 11/068,158, "Composite Polymer Fibers", filed Feb. 28, 2005.

Neavin et al., U.S. Appl. No. 11/068,159, "Composite Polymeric Optical Films With Co-Continuous Phases", filed Feb. 28, 2005.

Ouderkirk et al., U.S. Appl. No. 11/068,590, "Optical Elements Containing a Polymer Fiber Weave", filed Feb. 28, 2005.

Fleming et al., U.S. Appl. No. 11/067,848, "Polymer Photonic Crystal Fibers", filed Feb. 28, 2005.

Jonza et al., "Multilayer Polymeric Color-shifting Polarizer Films", Optical Security and Counterfeit Deterrence Techniques V, Proceedings of SPIE-IS&T Electronic Imaging, SPIE vol. 5310, 2004.

Li et al., "In-Situ Microgibrillar PET/iPP Blend via Slit Die Extrusion, Hot Stretching, and Quenching: Influence of Hot Stretch Ratio on Morphology, Crystallization, and Crystal Structure of iPP at a Fixed PET Concentration", Journal of Polymer Science: Polymer Physics, vol. 42, pp. 4095-4106, 2004.

Weber et al., "Giant Birefringent Optics in Multilayer Polymer Mirrors", SCIENCE, vol. 287, Mar. 31, 2000.

\* cited by examiner

POLYMERIC PHOTONIC CRYSTALS WITH CO-CONTINUOUS PHASES

RELATED APPLICATIONS

This application is related to co-owned U.S. patent application Ser. No. 11/068,157, titled "REFLECTIVE POLARIZERS CONTAINING POLYMER FIBERS", filed on even date herewith; Ser. No. 11/068,158, titled "COMPOSITE POLYMER FIBERS", filed on even date herewith; Ser. No. 11/068,159, titled "COMPOSITE POLYMERIC OPTICAL FILMS WITH CO-CONTINUOUS PHASES", filed on even date herewith; Ser. No. 11/068,590 titled "OPTICAL ELEMENTS CONTAINING A POLYMER FIBER WEAVE", filed on even date herewith; Ser. No. 11/067,848 titled "POLYMER PHOTONIC CRYSTAL FIBERS", filed on even date herewith; all of which are incorporated herein by reference.

FIELD OF THE INVENTION

The invention relates to polymer optical film and more particularly to polymer optical film that includes a polymeric photonic crystal for providing selective properties for transmission and reflection of light.

BACKGROUND

Optical films are used to modify the transmission, reflection, and absorption properties of an optical device. Common functions provided by optical films include the redirection of light, the provision of angularly selective transmission, reflection, and absorption, and the selective transmission of one polarization state of light. A common method of producing optical films is to form a structured surface on a film that either refracts or scatters light, or both. Methods for producing these types of films include microreplication and the provision of coatings that form a structured or optically active surface. Another method for making an optical film is to generate a composite film made from materials that have different optical properties. Examples of these types of films include coextruded polymeric layers that form interference filters and extruded blends of two different polymers to provide a randomly positioned discontinuous phase within a continuous phase.

Composite films are capable of providing complex optical functions that are highly desirable in many applications. A practical limitation of composite films, however, is that it is difficult to precisely position elements in more than one dimension. This lack of precision reduces the overall optical performance and cosmetic quality of optical films.

SUMMARY OF THE INVENTION

One particular embodiment of the invention is directed to a photonic crystal optical body. The body comprises a polymer matrix and an arrangement of polymer scattering fibers disposed within the matrix. The scattering fibers are substantially parallel to a first axis. Positions of scattering fibers in the arrangement across a cross-section of the polymer matrix are selected so as to form a two-dimensional photonic crystal structure for light incident on the polymer matrix in a direction substantially orthogonal to the first axis.

Another embodiment of the invention is directed to an optical system that comprises a photonic crystal comprising an arrangement of polymer scattering fibers within a polymer matrix. The scattering fibers are substantially parallel to a first axis. A light source is arranged and configured to generate a light beam incident on the photonic crystal in a direction orthogonal to the first axis.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
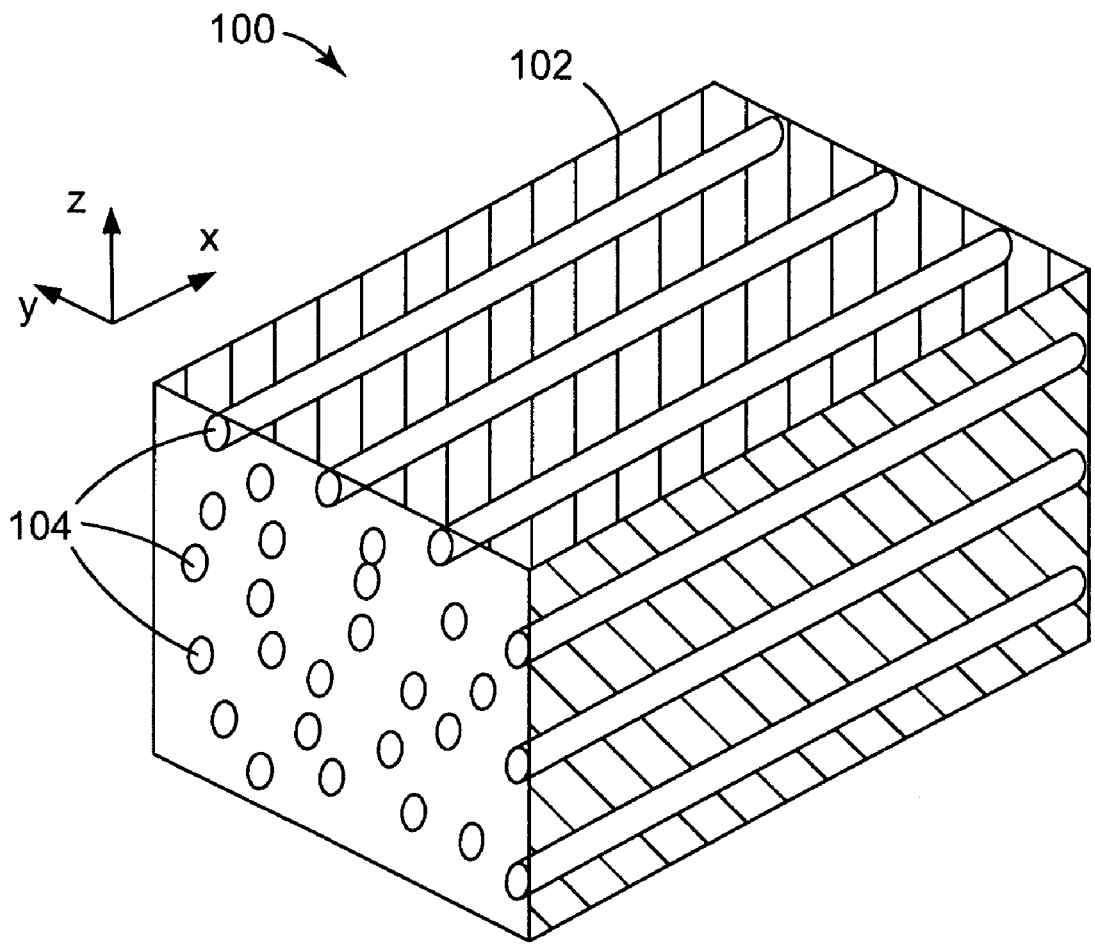
FIG. 1 schematically illustrates an embodiment of an optical element containing scattering fibers disposed within a polymer matrix, according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to polarized optical systems. For example, optical elements of the present invention may find application in systems such as liquid crystal displays, televisions, monitors, illuminated signs, cell phones and personal digital assistants (PDAs).

As used herein, the terms "specular reflection" and "specular reflectance" refer to the reflectance of light rays from a body where the angle of reflection is substantially equal to the angle of incidence, where the angles are measured relative to a normal to the body's surface. In other words, when the light is incident on the body with a particular angular distribution, the reflected light has substantially the same angular distribution. The terms "diffuse reflection" or "diffuse reflectance" refer to the reflection of rays where the angle of some of the reflected light is not equal to the angle of incidence. Consequently, when light is incident on the body with a particular angular distribution, the angular distribution of the reflected light is different from that of the incident light. The terms "total reflectance" or "total reflection" refer to the combined reflectance of all light, specular and diffuse.

Similarly, the terms "specular transmission" and "specular transmittance" are used herein in reference to the transmission of light through a body where the angular distribution of the transmitted light is substantially the same as that of the incident light. The terms "diffuse transmission" and "diffuse transmittance" are used to describe the transmission of light through a body, where the transmitted light has an angular distribution that is different from the angular distribution of the incident light. The terms "total transmission" or "total transmittance" refer to the combined transmission of all light, specular and diffuse.

Some embodiments of the invention relate to an arrangement of polymer fibers embedded in a polymer matrix. The fibers may be parallel or non-parallel, may be continuous in at least one direction within the film and may be randomly distributed across a cross-section of the matrix.

The resulting optical element may be used to elliptically scatter light, i.e., scatter light more highly in one plane of incidence than a second, orthogonal, plane of incidence, or with suitable materials and post-processing, to produce an element that scatters light in one polarization state more than it scatters light in the orthogonal polarization state. The scattering may be forward scattering or backward scattering. The light that remains unscattered, or minimally scattered, may be transmitted. The fibers may also be distributed in a manner such that light is coherently scattered by several fiber surfaces. This can produce a two-dimensional photonic crystal that allows higher control on the angular and wavelength selective properties of the optical element.

A cut-away view through an optical element according to one exemplary embodiment of the present invention is schematically presented in FIG. 1. The optical element 100, which may be in the form of a polymer optical film, comprises a polymer matrix 102, also referred to as a continuous phase. Polymer scattering fibers 104 are disposed within the matrix 102. In one particular embodiment, the fibers 104 are disposed generally parallel to an axis, illustrated as the x-axis in the figure. A scattering fiber 104 may extend through the length of the element 100, in the x-direction, and so may be referred to as a co-continuous phase. The element 100 is formed as a bulk optical body, and may, for example, be in the form of a sheet, a cylinder, a tube or the like. The body has a sufficient cross-sectional dimension, in the y-z plane, that the element is substantially self-supporting in at least one dimension. For example, if the element 100 is a sheet having a thin dimension in the z-direction and being significantly wider in the y-direction, then the element 100 is substantially self-supporting in the y-direction, since it can flex easily in the z-direction but not in the y-direction.

The refractive indices in the x-, y-, and z-directions for the material of the scattering fiber may be referred to as $n_{1x}$, $n_{1y}$, and $n_{1z}$, and the refractive indices in the x-, y-, and z-directions for the material of the polymer matrix 102 may be referred to as $n_{2x}$, $n_{2y}$, and $n_{2z}$. Where a material is isotropic, the x-, y-, and z-refractive indices for that material are all substantially matched. Where a material is birefringent, at least one of the x-, y- and z-refractive indices is different from the others. When two of the refractive indices are approximately the same and the third refractive index is different, the birefringent material is termed uniaxial, and when all three refractive indices have different refractive indices, the birefringent material is termed biaxial.

Either, or both, of the polymer matrix 102 and the scattering fibers 104 may be formed of a polymer material that is isotropic or birefringent. A birefringent material may be positively birefringent or negatively birefringent. When both the matrix 102 and the fibers 104 are birefringent, both may be positively birefringent or both may be negatively birefringent or one may be positively birefringent while the other is negatively birefringent.

The interface, or boundary, between the matrix 102 and a scattering fiber 104 may be discontinuous, with little mixing between the two polymer materials forming the matrix 102 and the fiber 104, or the two polymer materials may partially mix or diffuse into each other, or may react together, for example, may transesterify.

Different embodiments of the optical element 100 may be used in different ways to produce different optical effects. For example, the element 100 may be used as a reflective polarizer, in which light in one polarization state is preferentially reflected while light in the orthogonal polarization state is preferentially transmitted, or may be used as an elliptical diffuser, in which light is scattered more in one plane than in another, orthogonal plane. In another embodiment, the element 100 may be used as an unpolarized reflector for reflecting light, regardless of polarization. The scattering fibers 104 may be regularly spaced to produce a photonic crystal, which can increase the scattering efficiency of the fibers, provide wavelength selectivity, i.e., transmit certain wavelengths and reflect others, and/or enhance polarization contrast. Polarization contrast is defined as the transmission of the preferentially transmitted polarization of light divided by the transmission of the preferentially reflected polarization.

The refractive index of the components of the optical element 100 may be selected for optimum performance for the desired application. Where the element 100 is to be used as a reflective polarizer, it is preferred that at least the matrix 102 or the scattering fibers 104 be formed of a first polymer component with a high birefringence. High birefringence is considered to be above 0.05, with a value of at least 0.2 being preferred, and at least 0.3 being more preferred. Birefringence is the difference in refractive index between the high index direction and the low index direction. The refractive index difference at the interfaces between the fibers 104 and the matrix 102 for light polarized parallel to the x-axis, $n_{1x}-n_{2x}$, may be different from the refractive index difference for light polarized parallel to the y-axis, $n_{1y}-n_{2y}$. Thus, for one polarization state, the refractive index difference at the birefringent interfaces between the matrix 102 and the fibers 104 may be relatively small. In some exemplary cases, the refractive index difference may be less than 0.05. This condition is considered to be substantially index-matched. This refractive index difference may be less than 0.03, less than 0.02, or more preferably less than 0.01. If this polarization direction is parallel to the x-axis, then x-polarized light passes through the element 100 with little or no reflection or scattering. In other words, x-polarized light is substantially specularly transmitted through the element 100.

The refractive index difference between the matrix 102 and the fibers 104 may be relatively high for light in the orthogonal polarization state. In some exemplary examples, the refractive index difference may be at least 0.05, and may be greater, for example greater than 0.1, preferably greater than 0.2, and more preferably greater than 0.3. If this polarization direction is parallel to the y-axis, then y-polarized light is scattered at the birefringent interfaces, where the index difference is $n_{1y}-n_{2y}$. In other words, y-polarized light may be substantially diffusely reflected by the element 100.

While the exemplary embodiment just described is directed to index matching in the x-direction, with a relatively large index difference in the y-direction, other exemplary embodiments include index matching in the y-direction, with a relatively large index difference in the x-direction.

In other embodiments, the element 100 may be a form-birefringent reflective polarizer in which the anisotropic shape of the fibers 104 is used to selectively reflect one polarization and transmit the other. Form-birefringent polarizers may be fabricated using isotropic polymers, preferably with a very large index difference, greater than 0.2, between the first and second polymer materials used for the matrix 102 and fibers 104. Other embodiments of reflective polarizer may be constructed that use a combination of material birefringence and form-birefringence.

In some embodiments, the refractive index difference between the two polymer materials, the extent and shape of the interfaces between the two materials and the relative positions of the scattering fibers may result in diffuse scattering of one of the incident polarizations more than the other polarization. Such scattering may be primarily back-scattering (diffuse reflection) forward-scattering (diffuse transmission) or a combination of both back- and forward-scattering. In other embodiments, the element 100 may act as a shaped diffuser, for example an elliptical diffuser, in which the diffuser scatters light preferentially in certain directions. For example, in an elliptical diffuser, light is scattered more in a first direction perpendicular to the beam than the orthogonal direction perpendicular to both the first direction and the beam. An elliptical diffuser can be produced by having a relatively small index of refraction difference for at least one polarization of light. In general, an index difference of about 0.01 to about 0.02 is preferred for an elliptical polarizer. In other embodiments, the element 100 may provide form birefringence, where the scattering fibers and matrix are formed of isotropic materials, but the geometry of the fibers within the matrix provides an overall birefringent effect to light propagating within the matrix. In addition, selection of the refractive indices of the scattering fibers and matrix, and the inter-fiber spacing may lead to selective diffraction of the incident light.

Suitable materials for use in the polymer matrix and/or the fibers include thermoplastic and thermosetting polymers that are transparent over the desired range of light wavelengths. Suitable polymer materials may be amorphous, semi-crystalline or liquid crystalline, and may include homopolymer, copolymer or polymer blends, mixtures of polymers and reactive compounds, and mixtures of polymers with other functional materials. Examples of suitable reactive compounds include monomeric and oligomeric polymer precursors, including acrylates, silanes, epoxies, esters, and polyamic acid. Examples of suitable functional materials include dyes, pigments and plasticizers.

Suitable polymer materials include, but are not limited to, poly(carbonate) (PC); poly(styrene) (PS); C1-C8 alkyl styrenes; alkyl, aromatic, and aliphatic ring-containing (meth) acrylates, including poly(methylmethacrylate) (PMMA) and PMMA copolymers; ethoxylated and propoxylated (meth) acrylates; multifunctional (meth)acrylates; acrylated epoxies; epoxies; and other ethylenically unsaturated materials; poly (ethylmethacrylate) (PEMA); cyclic olefins; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly(dimethyl siloxane) (PDMS); polyurethanes; unsaturated polyesters; poly(ethylene), including low birefringence polyethylene; poly(propylene) (PP); polyamide; ionomers; vinyl acetate/polyethylene copolymers; cellulose acetate; cellulose acetate butyrate; fluoropolymers; poly(alkane terephthalates), such as poly (ethylene terephthalate) (PET); poly(alkane naphthalates), such as poly(ethylene naphthalate)(PEN); poly(styrene)-poly(ethylene) copolymers; poly(carbonate)/aliphatic PET blends; and PET and PEN copolymers, including polyolefinic PET and PEN. The term (meth)acrylate is defined as being either the corresponding methacrylate or acrylate compounds. These polymers may be isotactic, atactic and syndiotactic polymers, and may be used in various blends and copolymers. With the exception of syndiotactic PS, these polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table I below.

TABLE I

Typical Refractive Index Values for Some Polymer Materials

| Resin/Blend | S.R. | T (° C.) | $n_x$ | $n_y$ | $n_z$ |
|---|---|---|---|---|---|
| PEN | 1 | — | 1.64 | | |
| PEN | 6 | 150 | 1.88 | 1.57 | 1.57 |
| PET | 1 | — | 1.57 | | |

TABLE I-continued

Typical Refractive Index Values for Some Polymer Materials

| Resin/Blend | S.R. | T (° C.) | $n_x$ | $n_y$ | $n_z$ |
|---|---|---|---|---|---|
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS, PMMA copolymer | 1 | — | 1.55–1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the Eastar™ brand name. THV is a polymer of tetrafluoroethylene, hexafluoropropylene and vinylidene fluoride, available from 3M Company, St. Paul, Minn., under the brand name Dyneon™. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the material is unstretched and, therefore, unoriented. A stretch ratio of 6 means that sample was stretched to six times it original length. If stretched under the correct temperature conditions, the polymeric molecules are oriented and the material becomes birefringent. It is possible, however, to stretch the material above its glass temperature, Tg, without orienting the molecules. The column labeled "T" indicates the temperature at which the sample was stretched. The stretched samples were stretched as sheets. The columns labeled $n_x$, $n_y$ and $n_z$ refer to the refractive indices of the material. Where no value if listed in the table for $n_y$ and $n_z$, the values of $n_y$ and $n_z$ are the same as for $n_x$.

The behavior of the refractive index when stretching a fiber is expected to give results similar to, but not necessarily the same as, those for stretching a sheet. Polymer fibers may be stretched to any desired value that produces desired values of refractive index. For example, some polymer fibers may be stretched to produce a stretch ratio of at least 3, and maybe at least 6. In some embodiments, polymer fibers may be stretched even more, for example to a stretch ratio of up to 20, or even more.

A suitable temperature for stretching to achieve birefringence is approximately 80% of the polymer melting point, expressed in Kelvins. Birefringence may also be induced by stresses induced by flow of the polymer melt experienced during extrusion and film formation processes. Birefringence may also be developed by alignment with adjacent surfaces such as fibers in the film article. Birefringence may either be positive or negative. Positive birefringence is defined as when the direction of the electric field axis for linearly polarized light experiences the highest refractive index when it is parallel to the polymer's orientation or aligning surface. Negative birefringence is defined as when the direction of the electric field axis for linearly polarized light experiences the lowest refractive index when it is parallel to the polymer's orientation or aligning surface. Examples of positively birefringent polymers include PEN and PET. An example of a negatively birefringent polymer includes syndiotactic polystyrene.

The matrix 102 and/or the fibers 104 may be provided with various additives to provide desired properties to the optical element. For example, the additives may include one or more of the following: an anti-weathering agent, UV absorbers, a hindered amine light stabilizer, an antioxidant, a dispersant, a lubricant, an anti-static agent, a pigment or dye, a nucleating agent, a flame retardant and a blowing agent. Other additives may be provided for altering the refractive index of the polymer or increasing the strength of the material. Such additives may include, for example, organic additives such as polymeric beads or particles and polymeric nanoparticles, or inorganic additives, such as glass, ceramic or metal-oxide nanoparticles, or milled, powered, bead, flake or particulate glass, ceramic or glass-ceramic. The surface of these additives may be provided with a binding agent for binding to the polymer. For example, a silane coupling agent may be used with a glass additive to bind the glass additive to the polymer.

In some embodiments, it may be preferable that the matrix 102 be non-soluble, or at least resistant to solvents. Examples of suitable materials that are solvent resistant include polypropylene, PET and PEN. In other embodiments it may be preferable that the matrix is soluble in an organic solvent. For example, a matrix 102 formed of polystyrene is soluble in an organic solvent such as acetone. In other embodiments, it may be preferable that the matrix is water soluble. For example, a matrix 102 formed of polyvinyl acetate is soluble in water.

The fibers 104 may be arranged within the matrix 102 in many different ways. For example, the fibers 104 may be positioned irregularly across the cross-sectional area of the matrix 102. In FIG. 1, the position of different fibers 104 in the y-z plane is irregular. In addition, some fibers 104 may be made of a material that is different from the material of other fibers 104. For example, some fibers 104 may be made from an optically transparent material while other fibers 104 are made from an optically absorbing material.

Figure 2A:
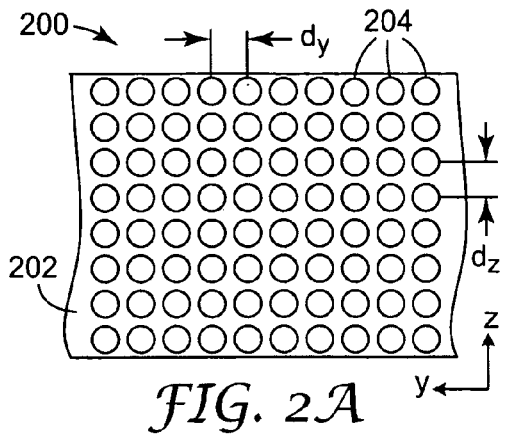
FIGS. 2A-2D schematically illustrate cross-sectional views of embodiments of optical elements containing scattering fibers according to principles of the present invention.
Figure 2B:
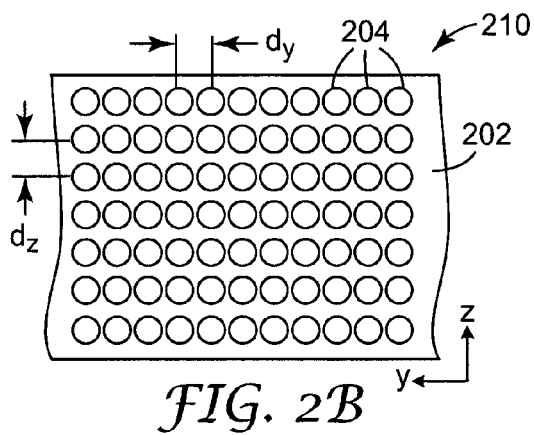

Other cross-sectional arrangements of fibers may be used. For example, in the exemplary embodiment schematically illustrated in FIG. 2A, which shows a cross-section through the element 200, the fibers 204 are arranged in a regular two-dimensional array within the matrix 202. In the illustrated embodiment, the separation distance between adjacent fibers 204 in the y-direction, $d_y$, is the same as the separation distance between adjacent fibers 204 in the z-direction, $d_z$. This need not be the case, and the separation distance in the z-direction, $d_z$, may be different from the separation distance in the y-direction, $d_y$, for example as is shown for the embodiment of the optical element 210 schematically illustrated in FIG. 2B.

Figure 2C:
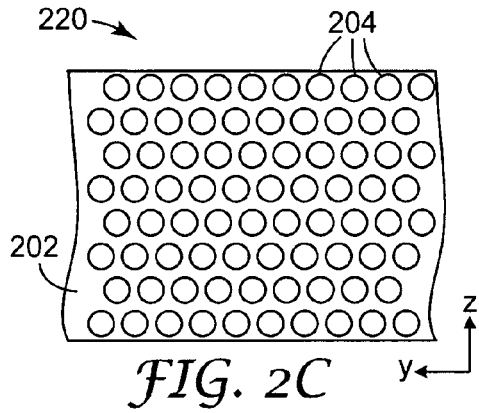
Figure 2D:
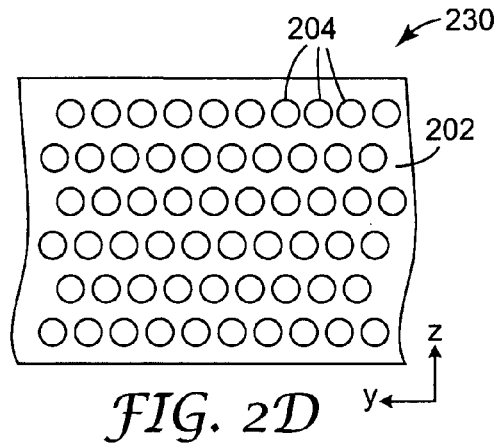

In another exemplary embodiment of element 220, schematically illustrated as element 220 in FIG. 2C, the positions of the fibers 204 may be offset between adjacent rows, resulting in a hexagonally-packed fiber pattern. In the illustrated exemplary embodiment, the positions of the fibers 204 correspond to a grid of triangles that are substantially equilateral. This may lead to a pattern that is referred to as hexagonal, close packed. This need not be the case. For example, as illustrated for the exemplary element 230 in FIG. 2D, the fibers 204 may fall in a hexagonal pattern that is based on isosceles triangles, rather than equilateral triangles.

In a preferred exemplary embodiment, the birefringent material may be of a type that undergoes a change in refractive index upon orientation. Consequently, as the polymer is oriented, refractive index matches or mismatches are produced along the direction of orientation. By careful manipulation of orientation parameters and other processing conditions, the positive or negative birefringence of the birefringent material can be used to induce diffuse reflection or transmission of one or both polarizations of light along a given axis. The relative ratio between transmission and diffuse reflection is dependent on a number of factors such as, but not limited to, the concentration of scattering fibers within the matrix, the dimension of the fibers, the square of the difference in the index of refraction at the birefringent interfaces, the size and geometry of the birefringent interfaces, and the wavelength or wavelength range of the incident radiation.

The magnitude of the index match or mismatch along a particular axis affects the degree of scattering of light polarized along that axis. In general, the scattering power varies as the square of the index mismatch. Thus, the larger the mismatch in refractive index along a particular axis, the stronger the scattering of light polarized along that axis. Conversely, when the mismatch along a particular axis is small, light polarized along that axis is scattered to a lesser extent, and the transmission through the volume of the body becomes increasingly specular.

If the index of refraction of a non-birefringent material matches that of the birefringent material along some axis, then incident light polarized with electric fields parallel to this axis will pass through the interface substantially unscattered, regardless of the size, shape, and density of the portions of birefringent material. For purposes of this disclosure, substantial matching between two refractive indices occurs when the difference between the indices is less than at most 0.05, and preferably less than 0.03, 0.02 or 0.01.

In addition, the bond between the matrix and the scattering fibers may be weak, which can be used to promote the formation of voids between the two polymers. Voids can especially be produced when the element is stretched. The presence of voids can increase the optical reflectivity of the film, since the refractive index mismatch between the polymer material and a void is relatively large. The presence of voids can increase the reflectivity regardless of whether the polymer materials present are isotropic or birefringent, although the presence of voids tends to reduce polarization sensitivity, since the refractive index difference at a void is typically at least as large as the birefringence of a birefringent polymer.

For polarization-dependent embodiments, the materials selected for use in an optical element in accordance with the present invention, and the degree of orientation of these materials, are preferably chosen so that the birefringent and non-birefringent materials in the finished optical element have at least one axis for which the associated indices of refraction are substantially equal. The match of refractive indices associated with that axis, which typically, but not necessarily, is an axis transverse to the direction of orientation, results in substantially no reflection of light in that plane of polarization.

The refractive index of the materials in some embodiments of optical element may vary along the length of the fiber, in the x-direction. For example, the element may not be subject to uniform stretching, but may be stretched to a greater degree in some regions than in others. Consequently, the degree of orientation of the orientable materials is not uniform along the element, and so the birefringence may vary spatially along the element.

Furthermore, the incorporation of fibers within the matrix may improve the mechanical properties of the optical element. In particular, some polymeric materials, such as polyester, are stronger in the form of a fiber than in the form of a film, and so an optical element containing fibers may be stronger than one of similar dimensions that contains no fibers.

In other exemplary embodiments, the scattering fibers may form other patterns within the cross-section of the optical element. For example, the scattering fibers may be arranged so as to fill some, but not all, positions of a regular grid pattern. The light scattered by the scattering fibers may be scattered diffusely, and be either transmitted or reflected. Furthermore, spaces or gaps may be introduced between adjacent scattering fibers or groups of scattering fibers. The size and distribution of such groups or spaces and gaps may be selected to produce particularly desirable spectral characteristics. For example some arrangements of scattering fibers may act as photonic crystals for light within particular wavelength ranges, which may lead to spectrally selective reflection and/or transmission. In photonic crystalline structures, the scattering becomes coherent, so that light scattered by one scattering fiber is coherent with light scattered by other scattering fibers. Consequently, an incident beam of light may be reflected or transmitted with the beam of light preserving a large degree of collimation. Coherent scattering may result in diffraction.

Prior studies of photonic crystalline structures, for example photonic crystalline fibers (PCFs), have concentrated on the use of a periodic arrangement of scattering sites, such as longitudinal holes, surrounding the core of a fiber to guide light along the fiber. The PCF may be a glass fiber. The confinement of light within the core is due to a photonic bandgap that arises from the particular arrangement of holes within the fiber. Asymmetries in the arrangement of holes in the fiber allow the fiber to demonstrate polarization dependent waveguiding properties. It is important to note, however, that these polarization dependent properties do not arise due to birefringence of the material used in the fiber.

Optical elements of the type disclosed herein differ significantly from glass fibers used in such PCF studies. First, the optical elements include scattering fibers, whereas glass PCFs use holes as scattering sites. In some embodiments, the materials of the optical element comprise at least one birefringent material, whereas the prior PCFs comprise only isotropic materials. Also, polymer materials are not typically used in longitudinally confining photonic crystalline structures because the optical losses in polymer are higher than in glass. In some embodiments of the present invention, the optical elements are illuminated from the side, with the result that the optical path length through the optical element is relatively short and so optical losses arising in the polymer material are small and can effectively be ignored. Thus, the use of polymer materials in the optical elements described herein does not introduce significant loss to the incident light. Furthermore, prior polymer and glass PCFs have used only isotropic materials and have not used birefringent materials.

Also, in some embodiments, the density of scattering fibers across the cross-section of the optical element, also referred to as the fill ratio, may be relatively uniform, with scattering fibers positioned across substantially the entire cross-section of the optical element. The total cross-sectional area of the scattering fibers may comprise between 1%-95% of the cross-sectional area of the optical element, preferably 10%-90% and more preferably 10%-50%. The fill ratio need not be uniform across the optical element. The scattering sites in a prior PCF, however, are typically concentrated around the center core of the fiber, with large areas surrounding the core being devoid of scattering sites. Consequently, the cross-sectional areas of the scattering sites comprise only a small fraction of the total cross-sectional area of the prior PCF.

The scope of the invention is intended to cover all arrangements of scattering fibers within the composite fibers. In some exemplary arrangements, the relative positions of the scattering fibers, the size of the scattering fibers, and the difference in the refractive index between the scattering fibers and the matrix materials may be set to provide desired spectrally selective properties to the composite fiber. Examples of such spectrally selective properties include, but are not limited to, reflection and transmission. In some embodiments of optical element, the cross-sectional locations of the scattering fibers may lead to incoherent scattering of the incident light. In other embodiments, the locations of the scattering fibers may lead to coherent effects in the scattered light that give rise to photonic crystal properties.

Additional exemplary embodiments of optical elements, showing an inexhaustive selection of possible scattering fiber arrangements, are now described.

Figure 3A:
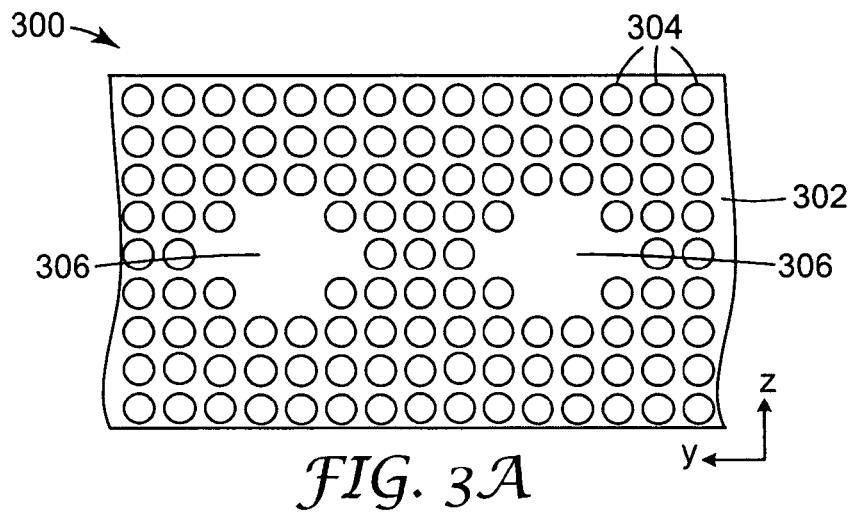
FIGS. 3A-3C schematically illustrate cross-sectional views of additional embodiments of optical elements containing scattering fibers according to principles of the present invention.
Figure 3B:
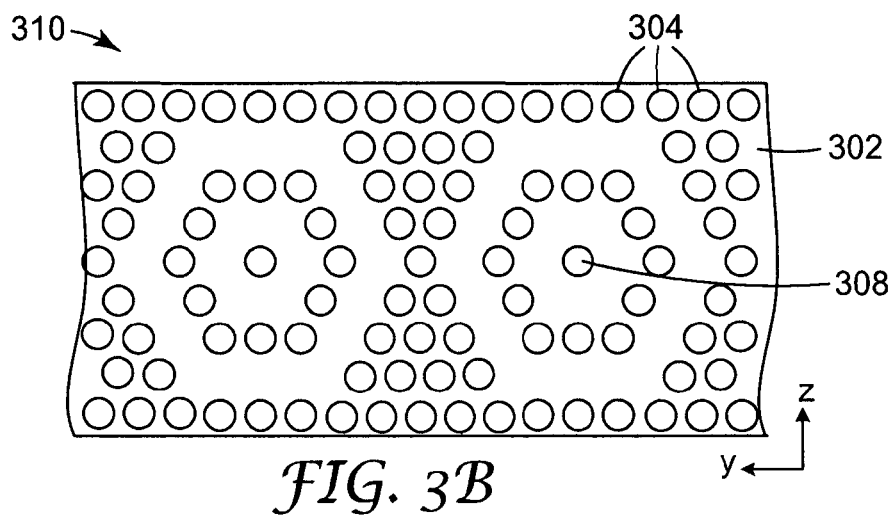

In the exemplary embodiment of optical element 300 schematically illustrated in FIG. 3A, some scattering fibers 304 are arranged regularly in a square array, with certain areas 306 of the array clear of scattering fibers. In another exemplary embodiment of optical element 310, schematically illustrated in FIG. 3B, the scattering fibers 304 may be arranged in concentric patterns around a center 308. A scatting fiber 304 may be positioned at the center 308 (as illustrated), or the center 308 may be free of a scattering fiber 304.

Figure 3C:
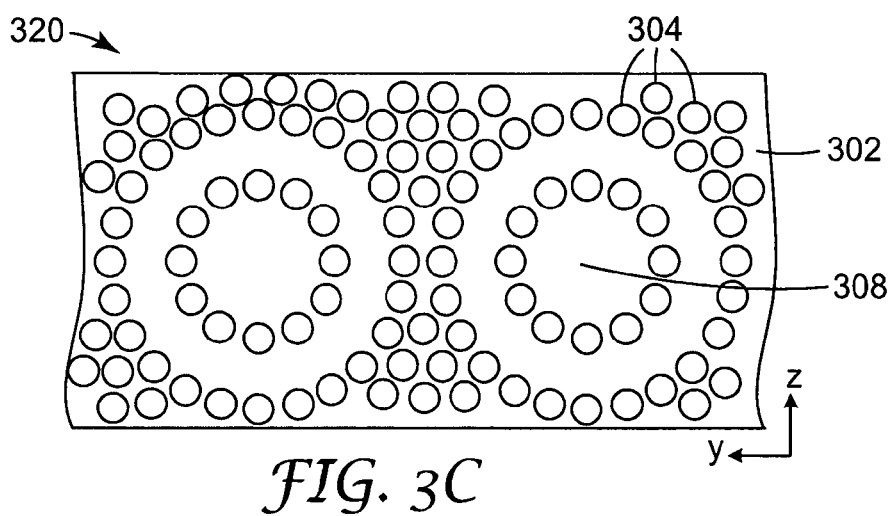

The size of the scattering fibers 304 and the sizes of the spaces between adjacent scattering fibers 304 may be selected for particular optical properties, such as transmission and/or reflection. In the example illustrated in FIG. 3B, the scattering fibers 304 are shown to be located in a ring at positions set by a hexagonal grid. This is not a necessary condition, and the scattering fibers 304 may be formed in a radially concentric pattern around the center 308, for example as is schematically shown for exemplary element 320 in FIG. 3C. In this exemplary embodiment, there are no fibers 304 at the pattern centers 308.

In some embodiments, the scattering fibers do not all have the same cross-sectional size. For example, as is shown for the embodiments of optical element 400 and 410, schematically illustrated in FIGS. 4A and 4B respectively, the elements 400, 410 may include scattering fibers 404 of different cross-sectional sizes. In these particular embodiments, the scattering fibers 404a are relatively larger in cross-section than the scattering fibers 404b. The scattering fibers 404 may fall into groups of at least two different sizes and may even all be of different sizes. In practice, the dimensions of the scattering fibers 404 may fall within a range, rather than being single-valued. In addition, different scattering fibers 404 may be formed of different materials.

Figure 4A:
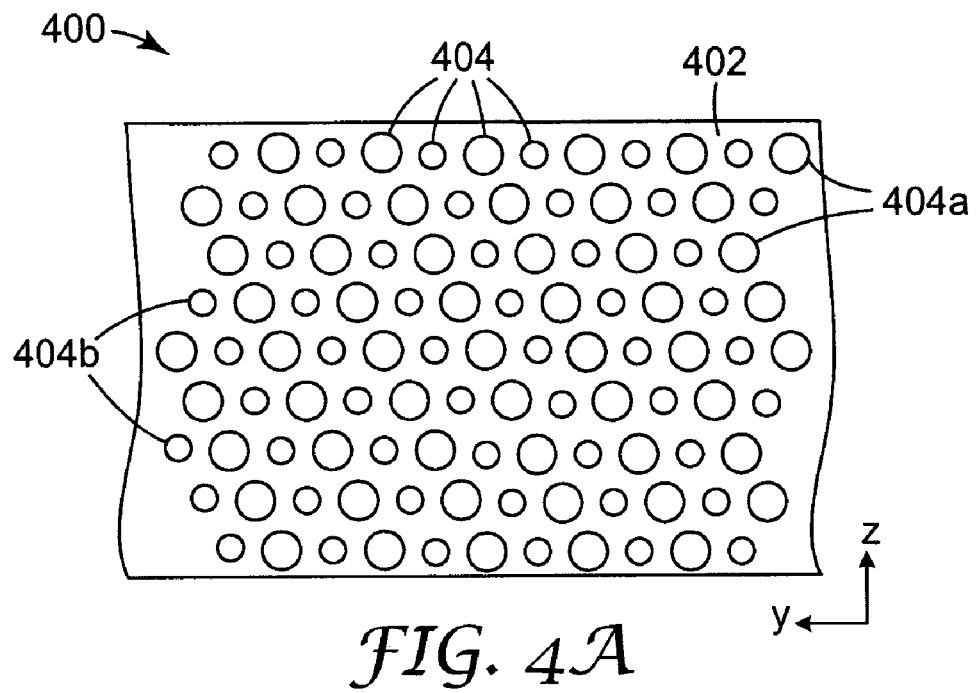
FIGS. 4A-4F schematically illustrate cross-sectional views of more embodiments of optical elements, showing cross-sectional patterns of scattering fibers, according to principles of the present invention.
Figure 4B:
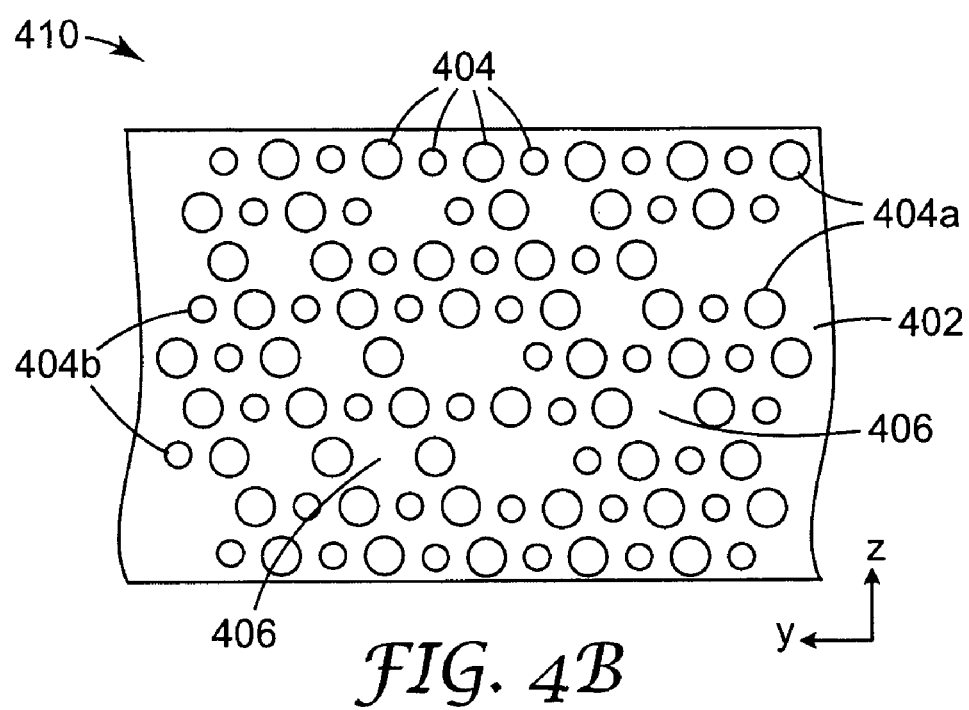

In some embodiments, the scattering fibers 404 lie at positions associated with a regular grid pattern, although not all positions of the grid pattern need be occupied by a scattering fiber 404, as is illustrated by the exemplary element 410 shown in FIG. 4B, which includes fibers 404 arranged on a hexagonal pattern, with some gaps 406 arising from grid positions not occupied by scattering fibers 404. Furthermore, the positions of scattering fibers of a particular size may be regular or irregular. In illustration, the larger fibers 404a and the smaller fibers 404b in the element 400 shown in FIG. 4A are each arranged regularly in alternating rows. This is not a requirement, however, and the fibers 404a and 404b may be arranged in different patterns. Furthermore, the cross-sectional arrangement of scattering fibers may have one or more axes of symmetry, or may be lacking axes of symmetry altogether.

Figure 4C:
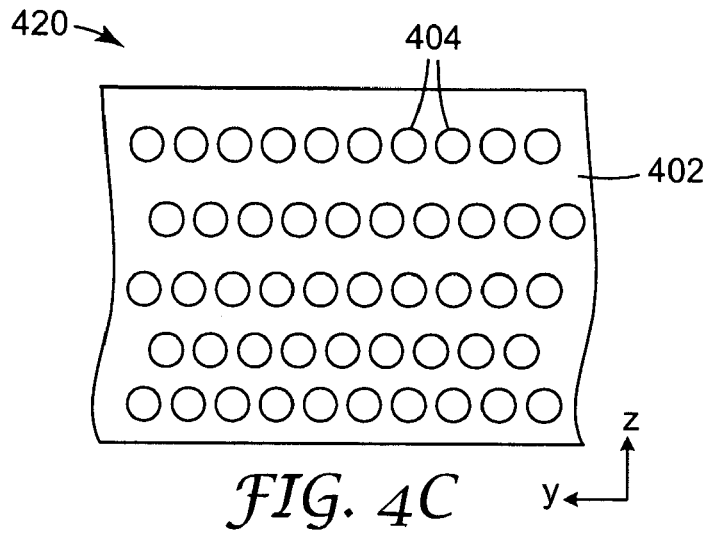

The scattering fibers may be regularly arranged in one direction and less regularly spaced in the other direction across the cross-section of the matrix. Furthermore, the spacing between scattering fibers need not be the same across the cross-section of the matrix, but may change from one region of the matrix 402 to another. For example, in the exemplary element 420 schematically illustrated in FIG. 4C, the spacing between rows of scattering fibers 404 increases from one side of the matrix 402 to the other, i.e., the spacing is different for different positions through the matrix 402 in the z-direction.

Figure 4D:
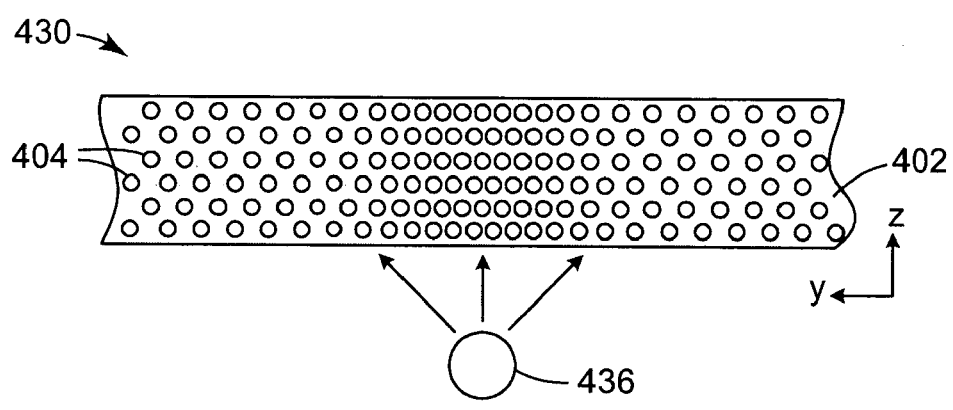

In other embodiments, the spacing may change along the width of the matrix, i.e., along the y-direction, or may change for different positions along both the y- and z-directions. For example, in the embodiment illustrated in FIG. 4D, an optical element 430 has scattering fibers 404 embedded within a matrix 402. In this particular embodiment, the center-to-center spacing between adjacent scattering fibers 402 is reduced in one region, at the center of the figure, relative to neighboring regions on either side, with the result that the fill factor, the fraction of the cross-sectional area taken up by the scattering fibers 404, for that region is increased. Such a variation in the fill factor may be useful, for example, to improve the uniformity of light transmitted through the element from a light source 436. This may be important, for example, in making the illumination of a direct-lit LCD uniform so that the viewer does not see a variation in brightness across the screen due to the discrete nature of the light bulbs used to illuminate the screen. When a light source is placed behind a uniform diffuser, the brightness of the light transmitted through the diffuser is highest above the light source. The variation in fill factor may be used to increase the amount of diffusion directly above the light source, thus reducing the non-uniformity in the intensity of the transmitted light.

Figure 4E:
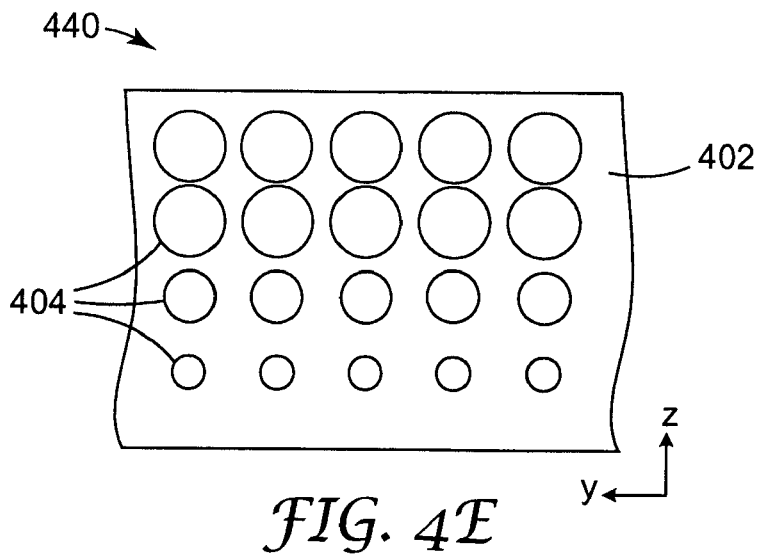
Figure 4F:
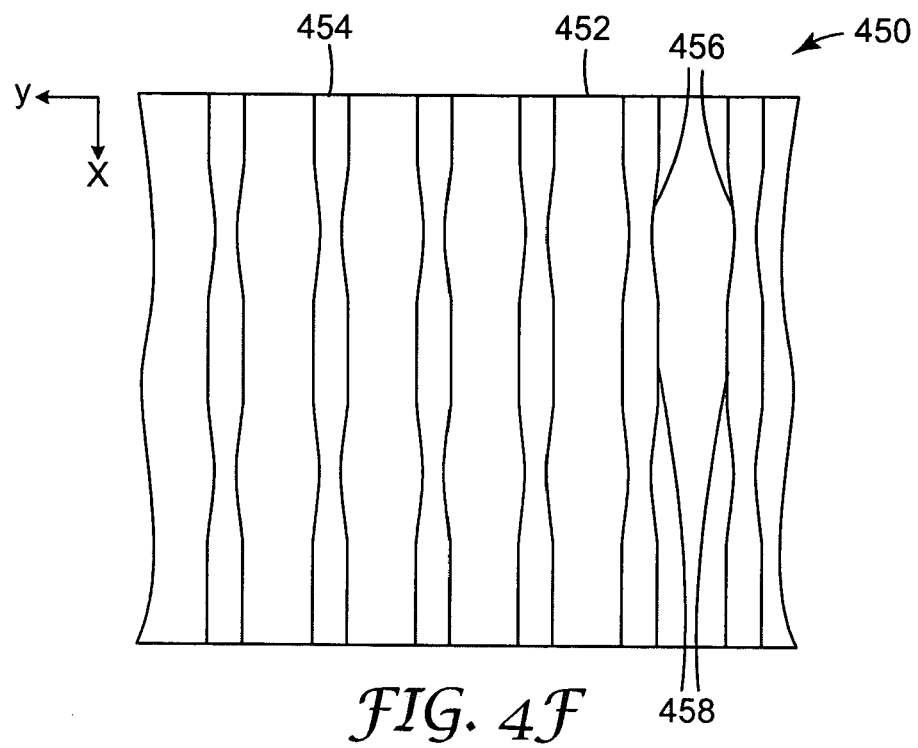

In other embodiments, the cross-sectional dimension of the scattering fiber 404 may change from one region of the matrix 402 to another. For example, in the exemplary optical element 440 schematically illustrated in FIG. 4E, the cross-sectional dimension of the scattering fibers 404 changes from one side of the matrix 402 to the other. In particular, for the illustrated embodiment, the diameter of the scattering fiber 404 increases for different positions along the z-direction. In other embodiments, the cross-sectional dimension may change along the width of the matrix, i.e., for different positions along the y-direction, or may change for different positions along both the y- and z-directions.

In the exemplary optical element 440, the center-to-center spacing of the fibers 404 is constant along the z-direction, although the separation between fibers 404 reduces in the z-direction, since the fibers increase in size for positions along the z-direction. In other embodiments, both the center-to-center spacing and/or the cross-sectional dimension of the fiber may change for different positions within the cross-section of the matrix 402.

Furthermore, a scattering fiber 404 may be uniform in cross-sectional dimension along its length, or the cross-sectional dimension may be different for different points along the length of the scattering fiber. Examples of such a variation are schematically illustrated in FIGS. 4F-4I, which show length-wise cross-sectional views through an optical element in the x-y plane, showing a side-on view to the scattering fibers. In the embodiment illustrated in FIG. 4F, the optical element 450 includes scattering fibers 454 embedded within a matrix 452. In this particular embodiment, the scattering fibers 454 have regions 456 where the cross-sectional dimension is less than elsewhere. Such regions may be produced, for example, by temporarily reducing the pressure on the scattering fiber polymer while the element 450 is being co-extruded. Alternatively, the regions of larger cross-section 458 may be formed by temporarily increasing the pressure on the scattering fiber polymer.

Figure 4G:
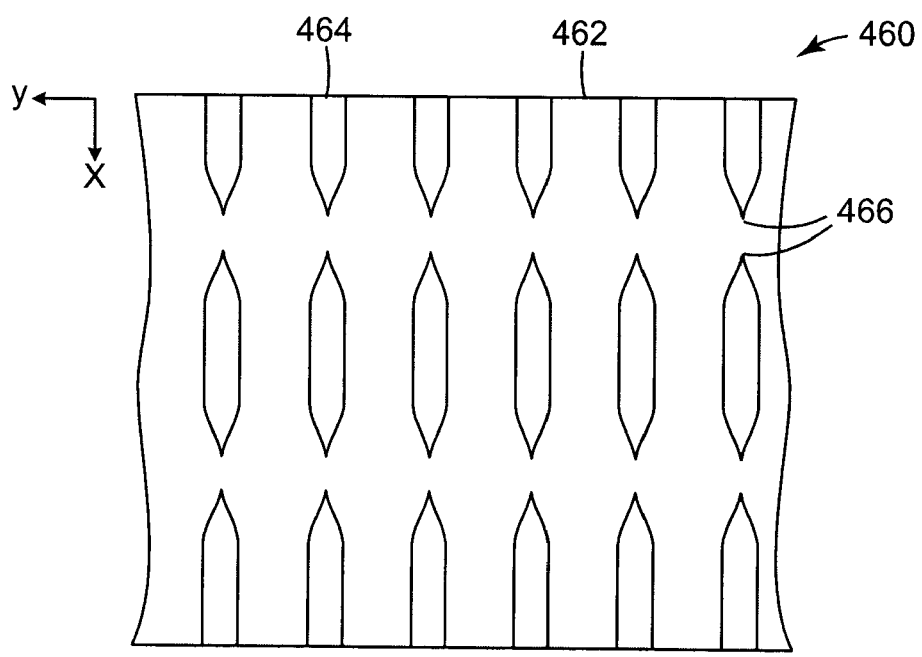
FIGS. 4G-4I schematically illustrate cross-sectional views of more embodiments of optical elements, showing variations in the cross-sectional dimension along the scattering fibers, according to principles of the present invention.

In another embodiment, schematically illustrated in FIG. 4G, the optical element 460 includes scattering fibers 464 within a matrix 462, where the cross-sectional width of the scattering fibers 464 is reduced to zero in some regions 466. This may be achieved by a greater reduction in the pressure of the scattering fiber polymer during co-extrusion.

Figure 4H:
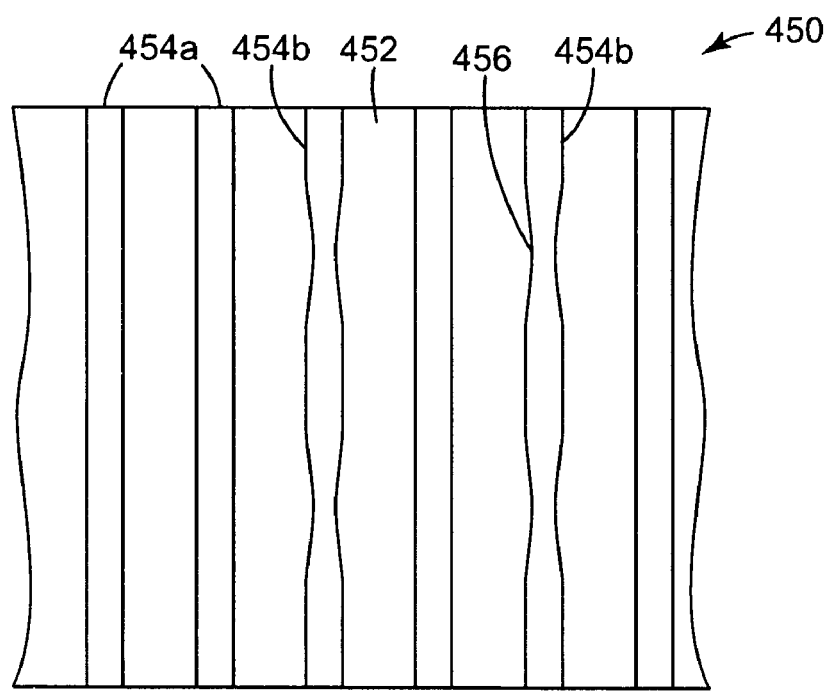
Figure 4I:
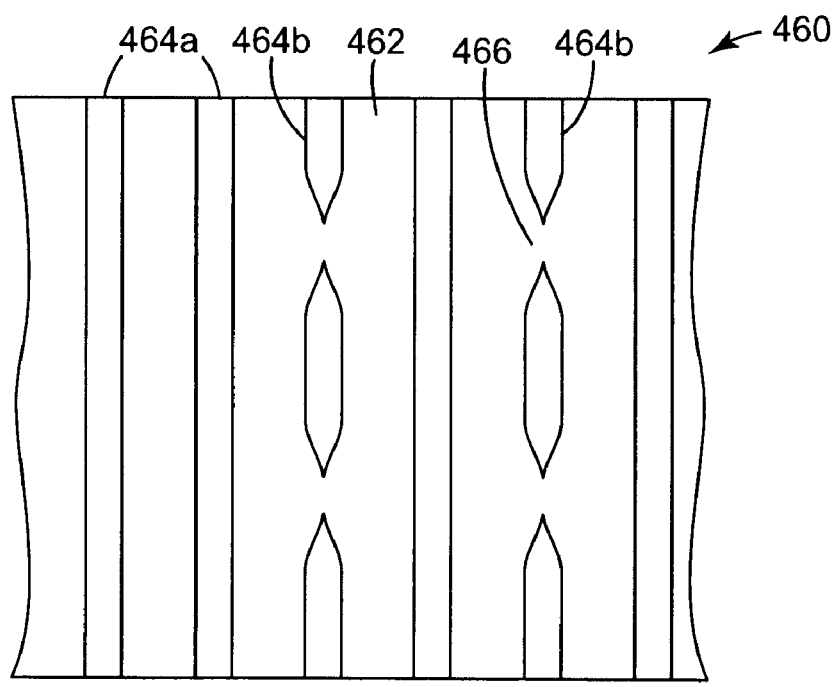

Not all scattering fibers need vary in cross-sectional dimension in the same manner. For example, FIGS. 4H and 4I show cross-sections similar to those of FIGS. 4F and 4G respectively, but where some scattering fibers 454a, 464a have uniform cross-sectional dimension and other scattering fibers 454b, 464b vary in cross-sectional dimension. Such variation in some scattering fibers 454b, 464b, may be achieved, for example, by having two inputs to a coextrusion feedblock for scattering fiber polymer. One of the inputs is subject to constant pressure, to produce the scattering fibers 454a, 464a of constant cross-section, while the other input is subject to a variation in the pressure, to produce the scattering fibers 454b, 464b of varying cross-section.

Figure 5:
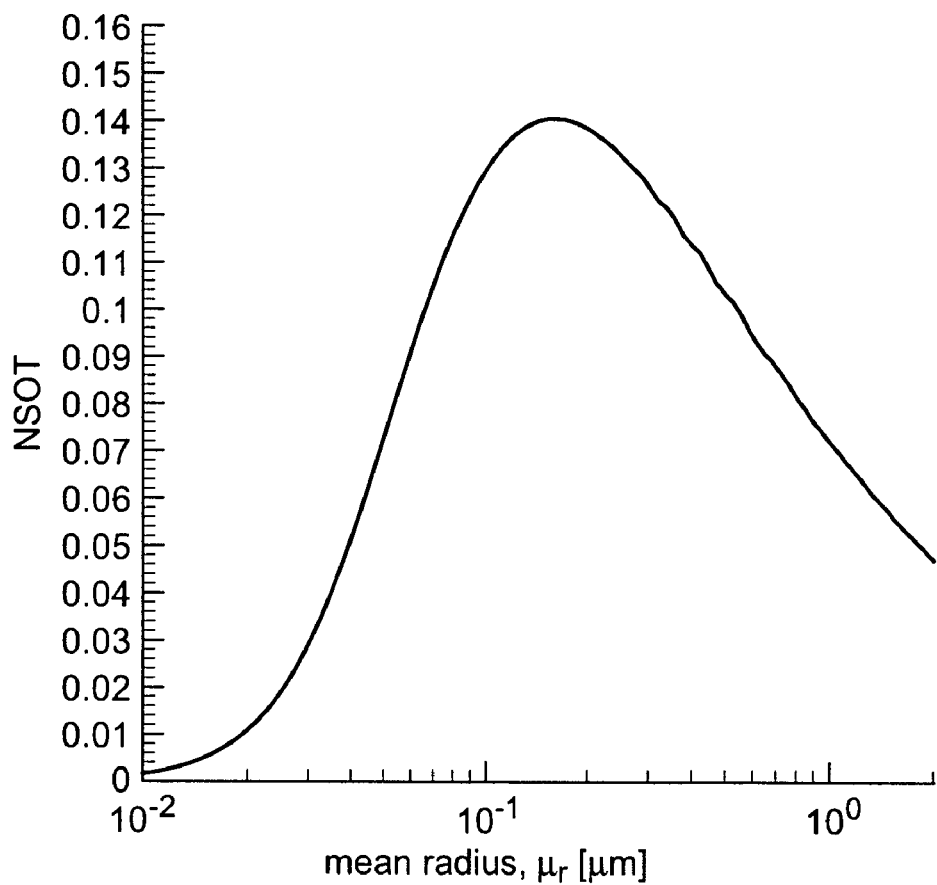
FIG. 5 presents a graph showing light scattering efficiency as a function of scattering fiber radius.

The size of the scattering fibers can have a significant effect on the scattering of the incident light. A plot of scattering effectiveness, the normalized, scaled optical thickness (NSOT), is shown as a function of mean radius of the scattering fiber, in FIG. 5. The value of the NSOT is given by the following expression:

$$NSOT=\tau(1-g)/(tf)$$

where $\tau$ is the optical thickness and equals tk, where k is the extinction cross-section per unit volume (the reciprocal of the mean free path for extinction), t is the thickness of the diffuser, f is the volume fraction of diffusers and g is the asymmetry parameter. The value of g is +1 for pure forward-scattering, −1 for pure back-scattering and zero for equally forward and backward scattering. The calculation used to produce the plot assumed that the vacuum wavelength of the incident light was 550 nm and that the scattering fiber had a circular cross-section.

As can be seen, the scattering effectiveness for visible light peaks at a radius of about 0.15 µm, and has a value of about half the maximum over the radius range of about 50 nm-1000 nm. The scattering fibers may have any desired cross-sectional dimension, but the cross-sectional dimension may be in the range of about 50 nm-2000 nm, and more preferably in the range of about 100 nm-1000 nm, for incident light centered at about 550 nm. The cross-sectional dimension is the diameter where the scattering fiber has an approximately circular cross-section, and may be taken as the scattering fiber width for non-circular fiber cross-sections. The size of the scattering fibers may be different where the optical element is being used for applications where the wavelength of the incident light lies outside the visible region of the spectrum, for example in the ultraviolet or infrared regions. In general, a preferred range for the cross-sectional dimension of the scattering fibers is around $\lambda/10$ to around $4\lambda$, where $\lambda$ is the vacuum wavelength of the light. Where the light is present in a range of wavelengths, the value of $\lambda$ may be taken as the center value of the wavelength range, although the composite fiber may also be provided with scattering fibers having a range of dimensions.

If the scattering fibers are too small, for example less than about one thirtieth of the wavelength of light within the composite fiber, or below about 0.012 µm for light at 550 nm in vacuum, and if the density of scattering fibers is sufficiently high, for example in the range of about 60%-80% of the composite fiber volume, then the element may behave as a medium with an effective refractive index somewhat between the indices of the scattering fiber and the filler along any given axis. In such a case, little light is scattered. When the scattering fiber's cross-sectional size becomes significantly larger than the light wavelength, for example at least about three times the wavelength or more, the scattering efficiency becomes very low and iridescence effects can occur.

Figure 6A:
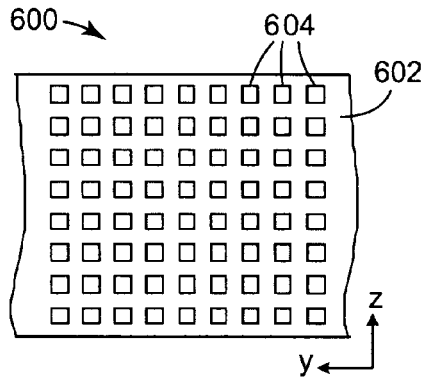
FIGS. 6A-6E schematically illustrate cross-sectional views of additional embodiments of optical elements containing scattering fibers according to principles of the present invention.

The scattering fibers may be round in cross-section, but need not be round and may have other cross-sectional shapes. In the exemplary optical element 600, schematically illustrated in cross-section in FIG. 6A, the matrix 602 is embedded with scattering fibers 604 having a square cross-section. Other shapes of cross-section may be used, for example regular and irregular polygonal shapes, such as triangular, rectangular or hexagonal, or cross-sectional shapes that combine curved and straight sides. The intention is not to limit the invention to scattering fibers having only those cross-sectional shapes shown in the illustrations. The use of scattering fibers having non-circular cross-sections is useful when the center-to-center fiber spacing is non-uniform, since it permits the scattering fibers to fill a greater fraction of the cross-sectional area of the optical element. For example, if the scattering fibers are arranged on a rectangular grid and the center-to-center spacing is twice as large in the y-direction as the z-direction, the scattering fibers fill a greater cross-section of the element if the scattering fibers have an elliptical cross-section that is twice as long in the y-direction than the z-direction than if the scattering fibers were circular.

Figure 6B:
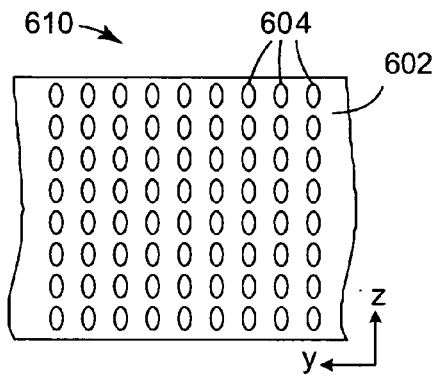
Figure 6C:
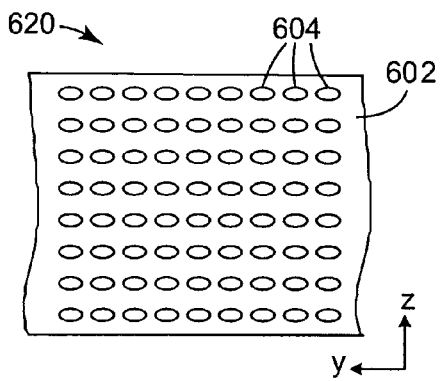
Figure 6D:
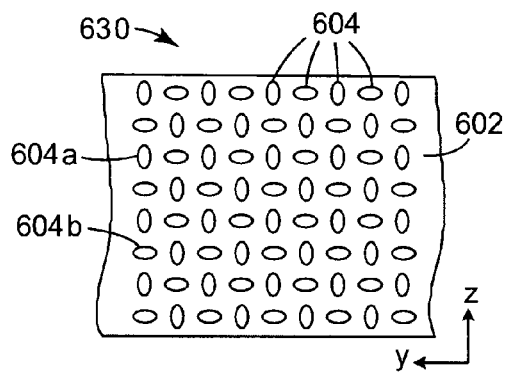

Some additional exemplary arrangements of scattering fibers having non-circular cross-section are schematically illustrated in FIGS. 6B-6D. The non-circular scattering fibers may be arranged with their cross-sectional shapes arranged in random directions. In other embodiments, the cross-sections of the scattering fibers may be aligned relative to each other. For example, in FIG. 6B, the optical element 610 is formed with a matrix 602 embedded with scattering fibers 604 having an elliptical cross-section. In this particular embodiment, the scattering fibers 604 are aligned with the long axis of the cross-sectional ellipse parallel with the z-axis. In other words, the long axis of the ellipse lies parallel with the thickness direction of the element 610. In the exemplary embodiment of optical element 620 illustrated in FIG. 6C, the elliptical fibers 604 are aligned with the short axis of the cross-sectional ellipse lying parallel to the z-axis, so that the short axis of the ellipse lies parallel with the thickness direction of the element 620.

The cross-sectional shape of the scattering fibers 604 may be a result of the shape of the extrusion die, or may be a result of post-processing the optical element after extrusion.

For example, an extruded web may be stretched across the web, a process referred to as tentering, with the result that the cross-sectional shape of an extruded scattering fiber is changed. One example of such a possibility is schematically shown in FIG. 6D: the elliptical cross-sectional shapes of the scattering fibers 604 may result from being extruded through elliptical dies, or may result from tentering a matrix that contains scattering fibers with circular cross-sections.

The scattering fibers 604 need not be arranged with their cross-sections all in alignment, but different scattering fibers 604 may have different alignments within the optical element. In the exemplary embodiment of optical element 630, schematically illustrated in FIG. 6C, the fibers 604 have an elliptical cross-section and some fibers 604a are arranged with their long axes parallel to the z-axis while other fibers 604b are arranged with their short axes parallel to the z-axis. Approximately half of the scattering fibers 604 are aligned in each direction. Also, the populations of the fibers 604a and 604b are arranged regularly within the cross-section of the element 630. It will be appreciated that the populations of the fibers 604a and 604b may also be arranged irregularly within the cross-section of the element 630.

Figure 6E:
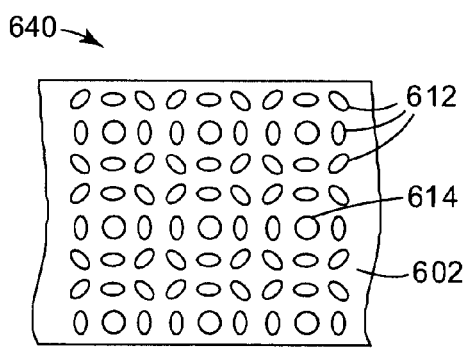

Other variations on the illustrated embodiments are possible. For example, not all scattering fibers need have the same cross-sectional shape, size or alignment. Furthermore, the scattering fibers may be cross-sectionally aligned to form patterns within the element. One particular example of such an element 640 is schematically illustrated in FIG. 6E. The matrix 602 is embedded with scattering fibers having two different shapes of cross-section, elliptical fibers 612 and circular fibers 614. In the illustrated embodiment, the elliptical fibers 612 are aligned so that the short axis of their elliptical cross-sections are directed towards the closest circular fiber 614.

Where the scattering fiber has a non-circular cross-section, the scattering fiber may lie untwisted within the matrix, so that one face of the scattering fiber is oriented towards one face of the element along the length of the scattering fiber. In other exemplary embodiments, the scattering fiber may be twisted about its longitudinal axis, e.g., twisted about an axis parallel to the x-axis, within the matrix. Consequently, at different points along the length of the twisted scattering fiber, a single face of the scattering fiber is oriented towards different surfaces of the matrix.

In some embodiments, the refractive index mismatch is the predominant factor relied upon to promote polarization dependent scattering within the matrix, although the cross-sectional shape of the composite fibers may also have an effect on scattering. For example, when the scattering fiber is elliptical in a cross-section, the elliptical cross-sectional shape may contribute to asymmetric diffusion in both back scattered light and forward scattered light. The effect can either add or detract from the amount of scattering from the index mismatch.

Figure 7:
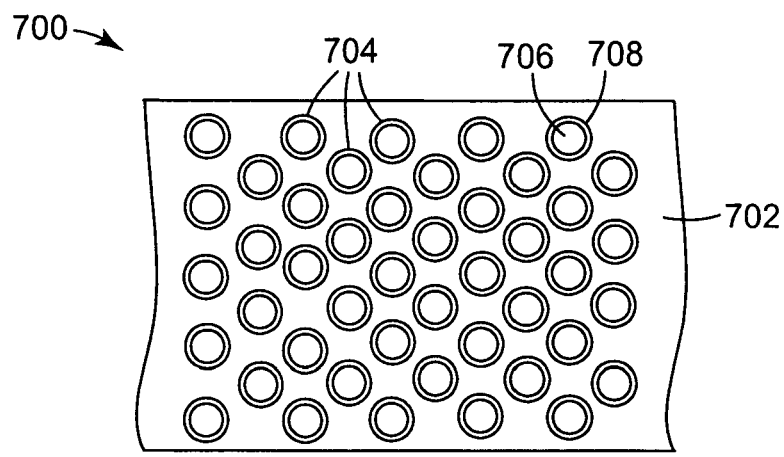
FIG. 7 schematically illustrate cross-sectional views of an embodiment of an optical element containing core/shell scattering fibers according to principles of the present invention.

In some embodiments, the scattering fibers may have a core and shell construction, wherein the core and shell are made out of the same or different materials, or wherein the core is hollow. Thus, for example, the scattering fibers may be hollow fibers of uniform or non-uniform cross section. The interior space of the fibers may be empty, or may be occupied by a suitable medium which may be a solid, liquid, or gas, and may be organic or inorganic. The refractive index of the medium may be chosen in consideration of the refractive index difference at the birefringent interfaces so as to achieve a desired degree of reflection or scattering at the birefringent interface. Suitable isotropic and birefringent polymer materials have been discussed above. One exemplary embodiment of such an optical element 700 having a matrix 702 embedded with scattering fibers 704 is schematically illustrated in FIG. 7. The fibers 704 comprise a core 706 surrounded by a shell 708.

The shell 708 may be used, for example, to affect the adhesion between the scattering fiber 704 and the polymer matrix 702. In some embodiments, the outer layer shell 708 may be formed of a material that increases the adhesion between the scattering fiber 704 and the polymer matrix 702, for example a polyester resin coating, a silane coating or other primer used for increasing the adhesion between the polymer matrix and the polymer fibers. In other embodiments, the shell 708 may be made of a material that reduces the adhesion between the scattering fibers 704 and the matrix 702, for example, fluorocarbon materials, silicone materials and the like. In some embodiments, the shell 708 may be used to provide an antireflection function, for example, by providing some refractive index matching between the core 706 and the polymer matrix 702.

Figure 8A:
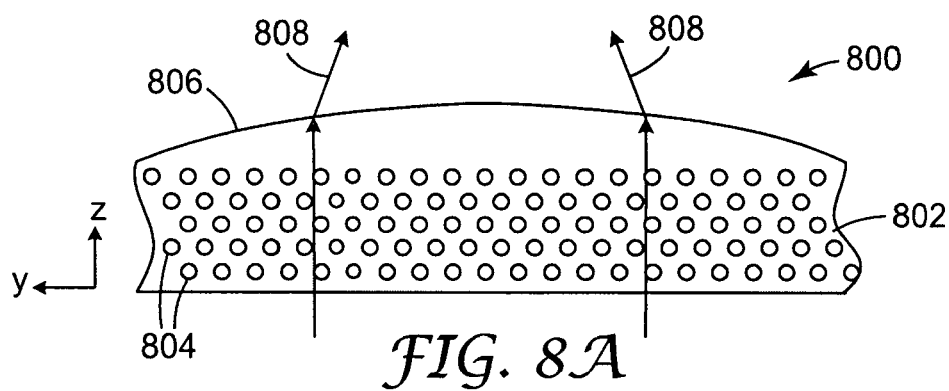
FIGS. 8A-8D schematically illustrate cross-sectional views through embodiments of optical elements having structured surfaces according to principles of the present invention.

The optical element may have flat surfaces, for example in the form of a sheet having major surfaces parallel to the x-y plane. The optical element may also include one or more surfaces that are structured to provide desired optical effects for transmitted or reflected light. For example, in one exemplary embodiment schematically illustrated in FIG. 8A, the element 800, formed with a matrix 802 and a number of scattering fibers 804, may have one or more curved surface 806. The curved surface 806 provides optical power, focusing or defocusing, to light transmitted through the surface 806. In the illustrated embodiment, rays 808 represent examples of light rays that are transmitted through the element 800 and are focused by the curved refracting surface 806. In other exemplary embodiments, the entrance surface of the element 800 may have a curved surface, or the surface structure on either the input side and/or the output side may include some other structure that provides optical power to light passing through the structured surface. One example of such a structure is a Fresnel lens structure.

The structured surface may also include rectilinear regions in addition to, or instead of, curved regions. For example, in another exemplary embodiment, schematically illustrated in FIG. 8B, the element 820, formed with a matrix 822 containing polymer fibers 824, may be provided with a prismatically structured surface 826, referred to as a brightness enhancing surface. A brightness enhancing surface is commonly used, for example, in backlit liquid crystal displays, to reduce the cone angle of the light illuminating the display panel, and thus increase the on-axis brightness for the viewer. The figure shows an example of two light rays 828 and 829 that are non-perpendicularly incident on the element 820. Light ray 828 is in a polarization state that is transmitted through the element 820, and is also diverted towards the z-axis by the structured surface 826. Light ray 829 is in a polarization state that is diffusely reflected by the element 820. The brightness enhancing surface may be arranged so that the prism structures are parallel to the fibers 824, which is also parallel to the x-axis, as illustrated. In other embodiments, the prism structures may lie at some other angle relative to the direction of the fibers 824. For example, the ribs may lie parallel to the y-axis, perpendicular to the fibers 824, or at some angle between the x-axis and the y-axis.

Structured surfaces may be formed on the matrix using any suitable method. For example, the matrix may be cured while its surface is in contact with the surface of a tool, such as a microreplication tool, whose tool surface produces the desired shape on the surface of the polymer matrix.

Figure 8B:
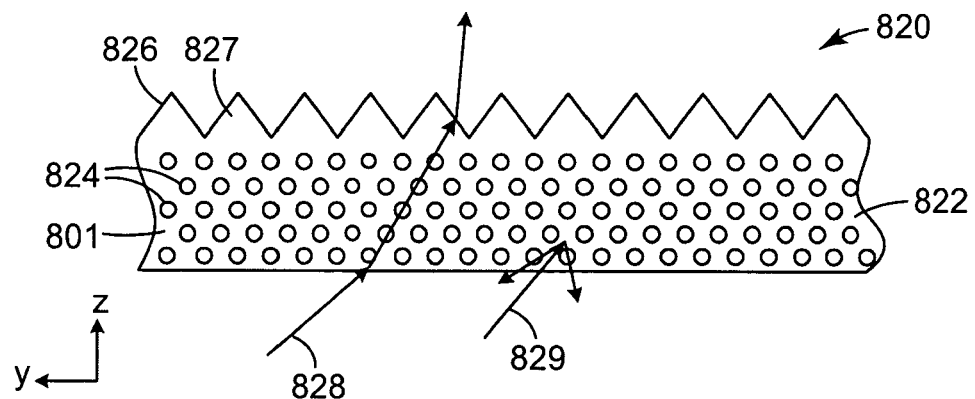
Figure 8C:
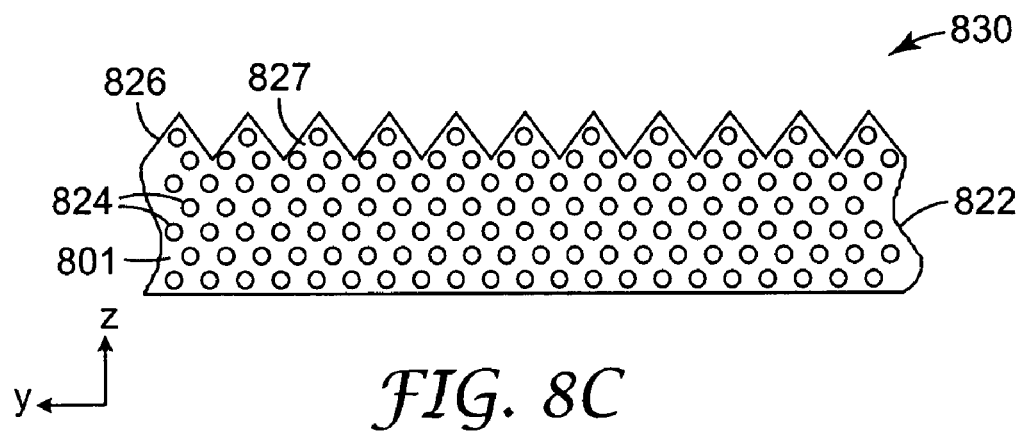
Figure 8D:
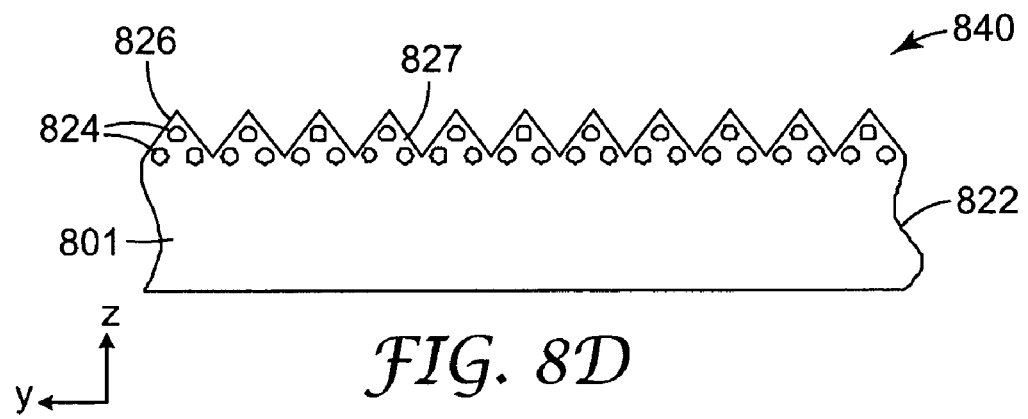

The scattering fibers may be present across different regions of the optical element. In FIG. 8B, the scattering fibers 824 are not located in the structure 827 formed by the structured surface 826, but are located only in the main body 801 of the element 820. In other embodiments, the scattering fibers 824 may be distributed differently. For example, in the optical element 830, schematically illustrated in FIG. 8C, the scattering fibers 824 are located within both the main body 801 of the element 830, and also in the structure 827 formed by the structured surface 826. In another example, schematically illustrated in FIG. 8D, the scattering fibers are located only in the structure 827 of the element 840 and not in the main body 801 of the element 840.

One method of making an optical element that contains scattering fibers is to coextrude the matrix with the scattering fibers. Coextrusion of polymer fibers has been discussed elsewhere, for example as discussed in greater detail in Handbook of Fiber Science and Technology: High Technology Fibers Part D, Vol. 3; Lewin and Preston (editors), Marcel Dekker, 1996, ISBN 0-8247-9470-2, incorporated by reference. Co-extrusion through a specially designed feedblock permits the selective placement of scattering fibers at desired locations within the element, and also permits the selection of different shapes for the scattering fibers. The extrusion may be a reactive extrusion process, for example as is commonly used with epoxies. In other approaches, the monomer may be extruded, followed by a post-extrusion cure (commonly called B-staging materials).

Coextruded structures, in other words the matrix co-extruded with the scattering fibers, are commonly inter-diffused, because the coextrudant materials are extruded at elevated temperatures when the materials are molten. Also, there are no coatings between the scattering fibers and the matrix. Other approaches of fabricating polymer structures, for example, encapsulating or impregnating pre-formed fibers, will result in little inter-diffusion between the matrix and scattering fibers. Furthermore, structures fabricated using such techniques often result in the use of processing aids such as sizing or coupling agents between the fibers and the matrix. In addition, co-extrusion is more likely to avoid the presence of bubbles around the scattering fibers and is more likely to maintain the desired spacings among the different scattering fibers to obtain the photonic crystal structure and also other structures.

Figure 9A:
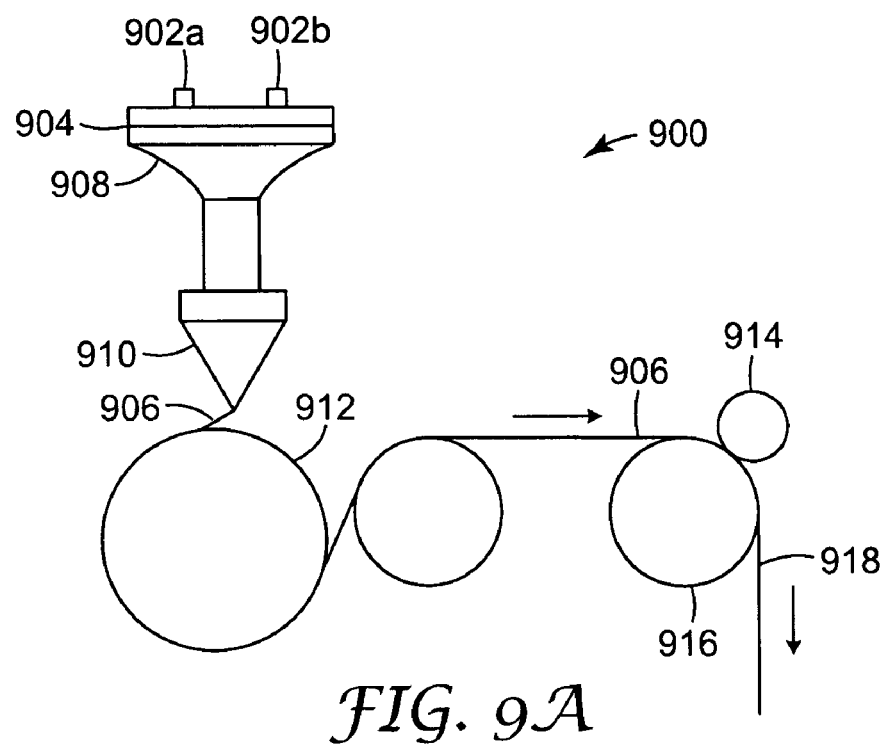
FIGS. 9A and 9B schematically illustrate an embodiment of a system that may be used for fabricating optical elements according to principles of the present invention.
Figure 9B:
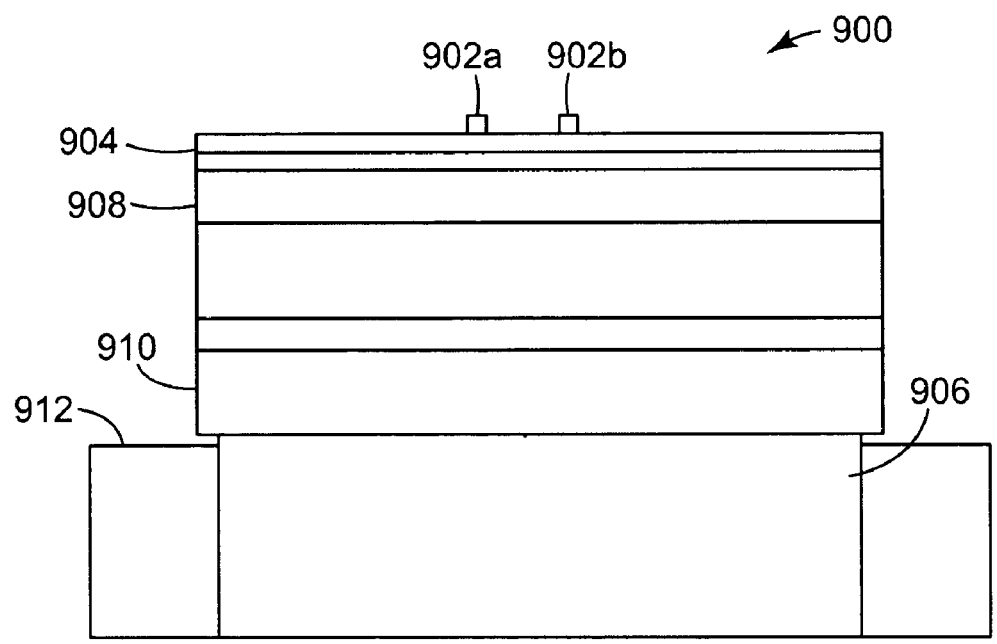

An embodiment of a coextrusion system 900 for making a film element that contains scattering fibers within a matrix is schematically illustrated in FIGS. 9A (side view) and 9B (front view). Two different polymers are pumped into respective inlets 902*a*, 902*b*, and fed to a distribution plate 904. The distribution plate 904 creates a polymer matrix of the first polymer containing fibers of the second polymer. The fiber-containing matrix is compressed in one or two directions in the compression section 908, and is extruded by die 910 onto the casting wheel 912 to produce the extruded sheet 906. Where the resulting extruded sheet 906 is about one meter across, the matrix may contain millions of fibers, for example up to 100 million fibers or more.

Following extrusion, the materials of the element may be oriented to develop birefringence in one or both of the matrix and the scattering fibers. One approach to developing birefringence in one or more of the components of the element is by physically stretching the element in one or more directions. The element may be stretched lengthwise, along the fiber length, widthwise, across the fibers, through the thickness of the element (in the z-direction), or a combination thereof. In the current example, the sheet 906 may be stretched down-web, across web, or through the thickness of the web. The dimensions of the element may be either constrained in one or more of the cross-directions during the stretching process, or may be allowed to relax. In general, the highest birefringence is achieved by allowing the cross-stretch direction dimensions to relax.

A structure may be formed on at least one of the surfaces of the optical element. For example, the sheet 906 may be embossed with a surface structure by passing the sheet 906 between a pair of rollers 914, 916. At least one of the rollers 914, 916 may be provided with an embossing surface, so as to product a structured sheet 918. Another approach to providing an element with a structured surface is to laminate a structured film onto the fiber sheet 906.

Figure 10A:
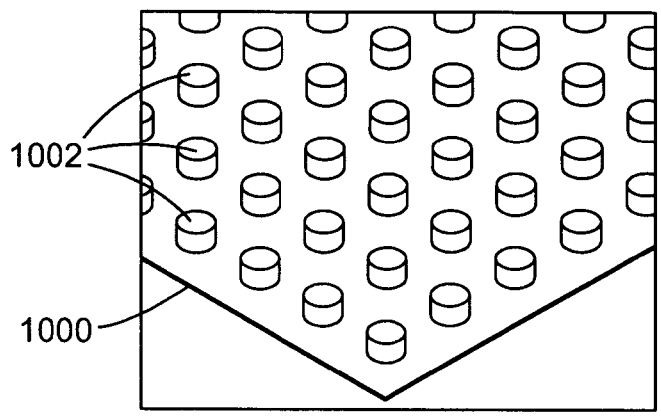
FIGS. 10A-10E schematically illustrate exemplary fabrication steps for an embodiment of a distribution plate that may be used in the system of FIGS. 9A and 9B.

One approach to forming the distribution plate 904 is a photolithographic method, which is now described with reference to FIGS. 10A-10E. FIG. 10A schematically shows a plate 1000 having an array of photolithographically defined resist features 1002. These features 1002 may be formed by coating a temporary structural plate with a photoresist. The plate 1000 should be electrically conductive, or have an electrically conducting coating, since the plate 1000 is to be used in a subsequent electroplating step. Additionally, the plate 1000 may also be provided with additional layers that will allow electroplated structures to be subsequently removed.

Figure 10B:
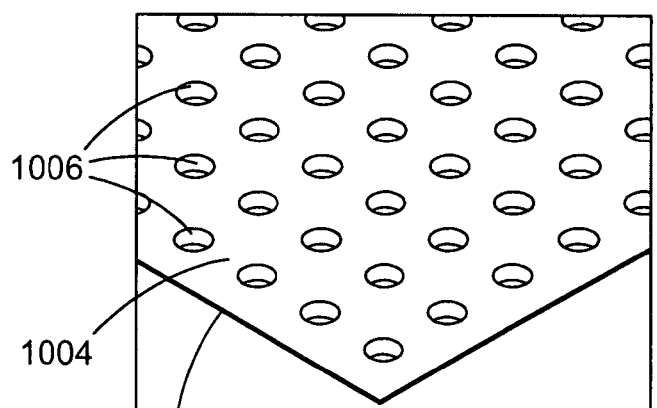

Once the plate 1000 is coated with the photoresist, the photoresist is exposed to radiation containing a desired exposure image, and the etchable areas of the resist are subsequently dissolved or otherwise etched away to produce the resist structures 1002. The plate 1000 may then be plated up with nickel or some other suitable metal to fill the volume between the resist structures 1002. The plated metal may then be planarized, for example by grinding, to form a planar surface 1004, and the resist structures 1002 etched away to produce a series of holes 1006 in the planar surface 1004, as schematically shown in FIG. 10B. Suitable approaches for grinding the surface 1004 include grinding or lapping with a fixed abrasive, a slurry abrasive, or a combination of the two. A thin layer of a conductive metal can then be applied to the planar surface 1004, for example, by sputtering.

Figure 10C:
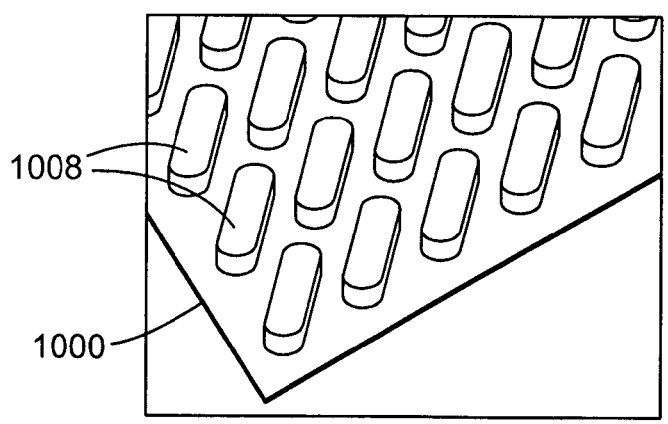
Figure 10D:
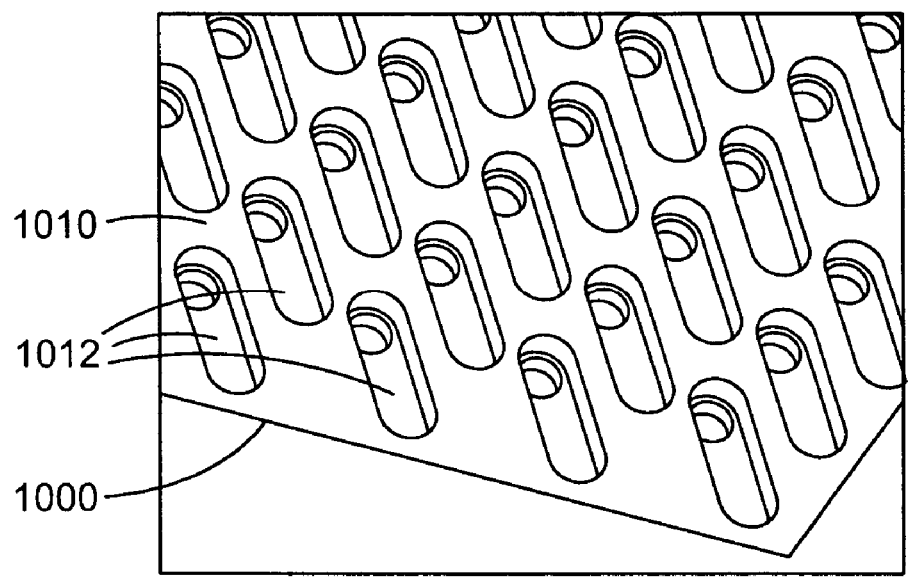
Figure 10E:
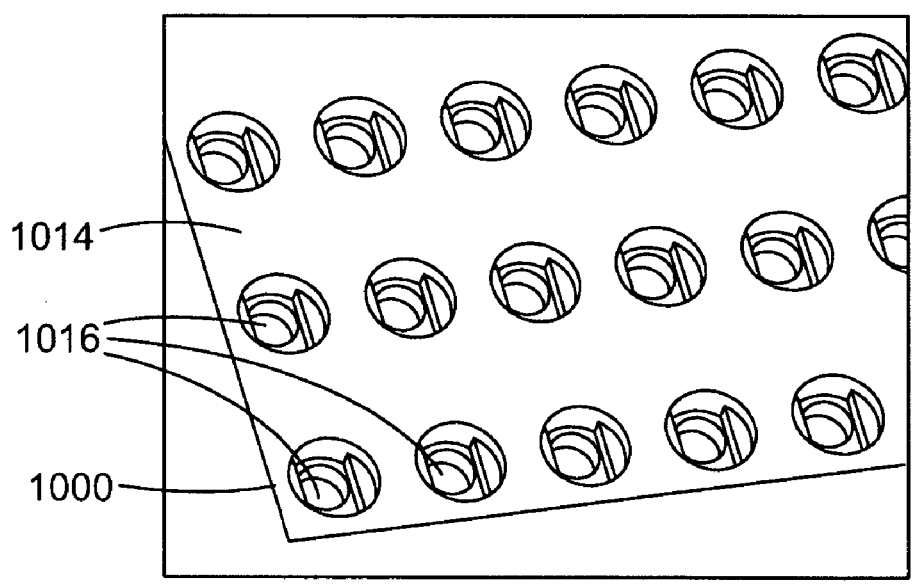

Another layer, with slots connecting to two of the holes 1006 is next prepared in the following manner. The plate 1000 of FIG. 10B is first covered with a photoresist which is exposed and etched to form a number of photoresist structures 1008, as schematically shown in FIG. 10C. Each structure 1008 is formed over two of the holes 1006. The plate 1000 is then plated up between the photoresist structures 1008 and ground to form a planar surface 1010. The photoresist structures 1008 are then etched away to form a series of slots 1012 in the surface 1010, as schematically shown in FIG. 10D. Each slot 1012 communicates with two holes 1006.

Another layer of photoresist is formed over the slotted surface 1010, and the steps of i) exposing the photoresist, ii) etching the photoresist to form photoresist structures, iii) plating up between the photoresist structures, iv) planarizing to form a flat surface and v) etching to remove the photoresist structures are followed once more to produce the planar surface 1014 that has a number of holes 1016. The holes 1016 communicate with the slots 1012 which, in turn, communicate with the holes 1006. The number of holes 1016 on the plate 1000 is one half the number of holes 1006. Thus, the arrangement of layers containing the holes 1006, slots 1012 and holes 1016 doubles the number of paths through which the polymer can travel. Thus, each pair of layers, a layer of slots accompanied by a layer of holes, created by the sequence described above divides the polymer flow by two. Therefore, ten layers can produce 32 fibers, forty layers can produce one million fibers, fifty layers can produce 33 million fibers, and so on. A polymer sheet filled with scattering fibers that has high reflectivity typically contains about 100 million scattering fibers in a sheet one meter wide by 100 µm thick.

Another approach to making a distribution plate is to stack milled or perforated sheets, for example, metal sheets, that are aligned with each other to form a bifurcating network. The sheets may be bonded to each other, for example, by coating each sheet with a thin layer of a fusable metal such as silver solder and then applying suitable heat and pressure to bond the stack of sheets together. At least several layers of the distribution plate may also be made from patterned and etched silicon. The silicon layers may be simply stacked with careful alignment or may be bonded using silicon bonding methods.

In some embodiments, the distribution plate may be made up of at least two sections, a first section to divide the different polymers into a moderate numbers of individual streams, and a second section to multiply the number of streams. The first section may be made by one method, such as milling or etching metal sheets and bonding the plates together. The second section may be affixed, bonded, or removably attached to the first section. Suitable approaches for bonding include using a fusable metal coating to solder the two sections to each other, and providing a mechanical interlock to attach the two sections. The two sections may be aligned to each other, and laid on a structural support. It is preferred that the support provides adequate support to both plates such that they do not distort under the pressure of polymer flow to such an extent as to affect the function of the distribution plate, while still allowing the polymer matrix and fibers to flow into the compression section.

The final geometry of the scattering fibers in the extruded sheet is dependent on both the shape of the holes of the last layer of the distribution plate seen by the polymer flow before entering the compression section, and the viscosity ratio of the polymers. In general, lower viscosity polymers tend to flow around higher viscosity polymers. Therefore, it is generally preferred that the fibers have a higher viscosity than the matrix polymer, thus permitting the matrix polymer to flow around the fiber polymer. The last layer of the distribution plate may also include holes of shapes that increase the ability for the matrix polymer to flow around the fiber polymer. For example, the holes providing flow to the matrix polymer may be elongated to partially encircle the fiber holes.

The small holes in the distribution plate may be blocked with debris and degradation products in the polymer stream. Accordingly, the polymer streams may be filtered, preferably to a size smaller than the smallest hole size of the distribution plate. The filters may be positioned in the tubing used to provide polymer to the feedblock, immediately before the polymer enters the distribution plate, or both.

EXAMPLE

Figure 11:
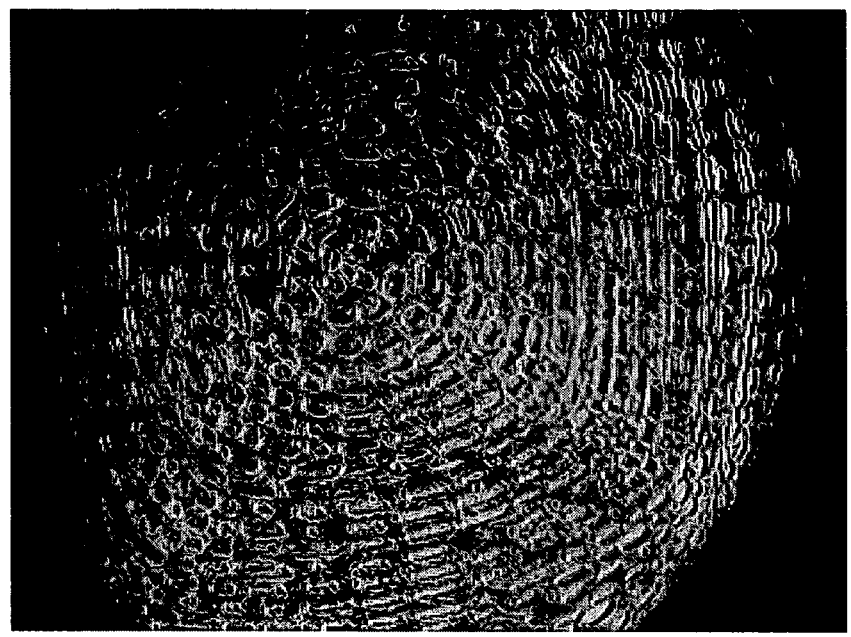
FIG. 11 presents a photograph showing a cross-section of a co-extruded composite fiber containing scattering fibers within a matrix.

In an example of coextruding an element containing scattering fibers, a distribution plate, having one hundred and eighteen laser-machined plates and eleven end-milled plates, was assembled, having two input ports and about 1000 "island" ports. The feedblock was designed to achieve scattering fibers that have substantially equal polymer flow. A cross-section through the resulting coextruded element, in the form of a composite fiber, is shown in the photograph in FIG. 11. The composite fiber comprised a PEN (90%)/PET (10%) copolymer, as the scattering fiber "islands" in a matrix "sea" of a PETG copolyester, Eastar™ 6763, supplied by Eastman Chemical Co., Kingsport, Tenn. The extruded element had a diameter of about 200 µm. The extruded element was not stretched but, with stretching while maintaining geometric shape, could reach a diameter of around 25 µm, i.e. a reduction in diameter of around 87%. At such a stretch, the spacing between the scattering fibers would be about 500 nm. The cross-sectional dimensions of the scattering fibers will depend on the ratio of the flow rates of the two different polymer materials.

Figure 12:
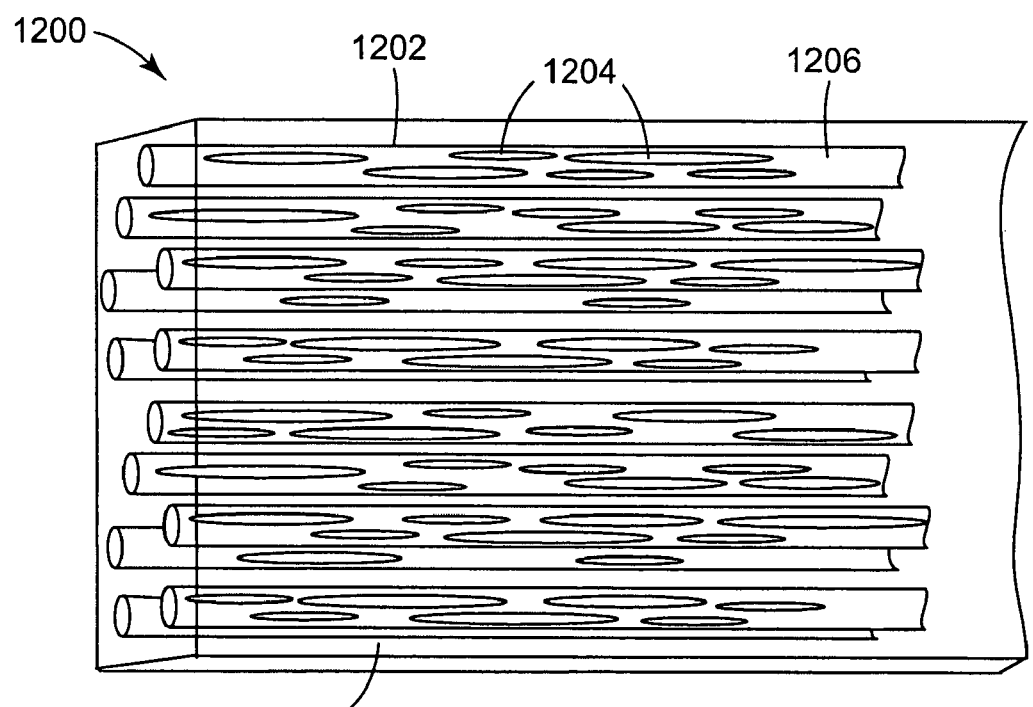
FIG. 12 schematically illustrates a partial cross-section through an embodiment of a body containing disperse phase scattering fibers, according to principles of the present invention.

In another approach to forming a scattering fibers within a matrix, a first polymer is used as the matrix, but with second and third polymers being used for the scattering fibers and extruded through the "island" ports of an extrusion feedblock. In some embodiments, the second and third polymers are not miscible with each other, and at least one of the second and third polymers is birefringent. The second and third polymers may be mixed and extruded as scattering fibers in a the optical element. Upon processing, the scattering fibers contain both a continuous phase and a dispersed phase, from the second and third polymers, respectively. This type of scattering fiber is referred to as a dispersed phase scattering fiber. An example of an optical element 1200 containing dispersed phase scattering fibers 1202 is schematically illustrated in FIG. 12, showing scattering fibers 1202 that include a disperse phase 1204 in a continuous phase 1206. The disperse phase scattering fibers 1202 are surrounded by the matrix 1208. In other embodiments, the scattering fibers may be formed of a second polymer and a third material, where the third material is a liquid crystal material, a liquid crystal polymer or a polymer.

The size requirements for the scattering fibers are similar among all the various embodiments. The size of the scattering fiber will need to be scaled up or down appropriately to achieve the desired size scale for the systems comprising scattering fibers containing a continuous and disperse phase, dependent on the desired operating wavelength or wavelength range.

Figure 13A:
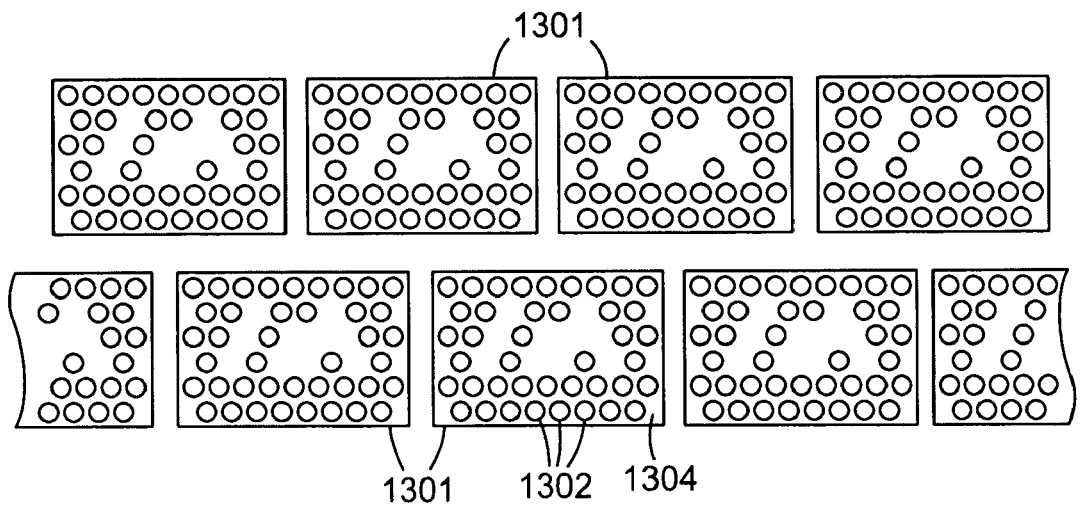
FIGS. 13A and 13B schematically illustrate embodiments of steps in fusing multiple composite fibers to form a fused composite fiber optical element, according to principles of the present invention.

Another approach to forming an optical element is now discussed with reference to FIGS. 13A and 13B, which is discussed in co-owned U.S. patent application Ser. No. 11/068,158, titled "COMPOSITE POLYMER FIBERS", filed on even date herewith. A number of separate composite fibers 1301 are shown in FIG. 13A. These fibers 1301 contain scattering fibers 1302 with a filler 1304 between the scattering fibers 1302 and may be formed, for example, by coextrusion. In the illustrated embodiment, the composite fibers 1301 have a square cross-section and have the scattering fibers 1302 arranged in a specific, regular cross-sectional pattern. There is no axis of symmetry in this particular pattern. Other shapes of composite fibers 1301 may be used, for example, round, elliptical, rectangular and the like, and other cross-sectional arrangements of scattering fibers 1302 may be used.

Figure 13B:
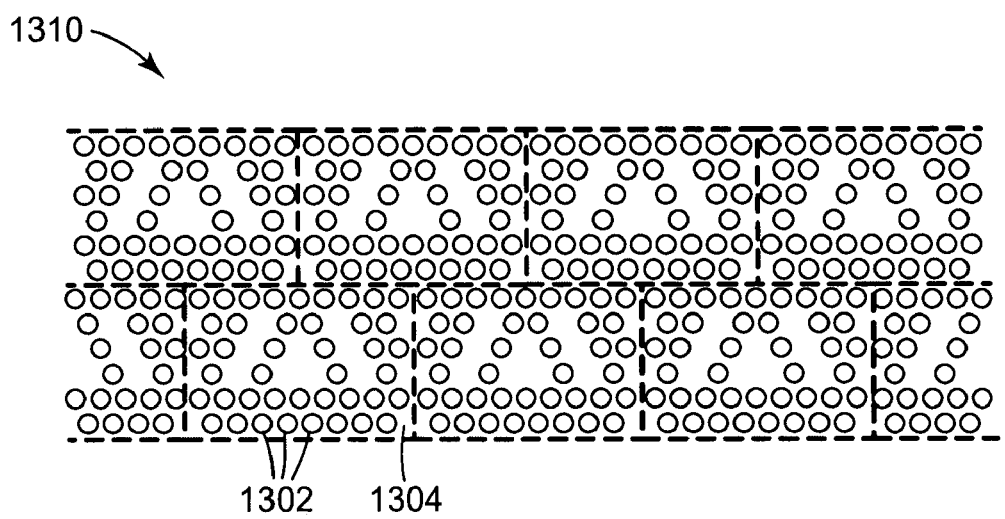

The fibers 1301 are fused together to form an optical element 1310 in sheet form, for example, as schematically illustrated in FIG. 13B. The dashed lines show where the boundaries between the fibers 1301 used to be before fusing. The fibers 1301 may be fused together using different methods. For example, the fibers 1301 may be fused together via the application of pressure and/or heat. When heat is applied to the fibers 1301, the temperature of the fibers need not reach the melting temperature of the polymeric materials of the fibers 1301, but need only reach a temperature sufficiently high to permit the fibers 1301 to adhere to each other. For example, the temperature may reach a value above the glass temperature, Tg, of the filler 1304, but below the melting temperature of at least one of the polymer components of the fiber 1301. In another approach, the fibers 1301 may be coated with, or the spaces between the fibers 1301 infiltrated with, a material that adheres the fibers 1301 together. Such a material might be, for example, a curable resin, such as an acrylate. It would be preferred for the refractive index of the adhering material to be close to the refractive index of the filler material of the composite fibers 1301. In another approach, the composite fibers 1301 may be treated with a solvent that makes the surface of the composite fibers 1301 tacky, with the result that the composite fibers 1301 adhere to each other through the application of pressure.

The fibers 1301 may be arranged as individual fibers before fusing, and they may be aligned parallel to each other (as illustrated) before fusing. In some approaches, the fibers 1301 need not be aligned parallel to each other before fusing. In other approaches, the fibers 1301 may be provided in tows or weaves before fusing. The individual tows or weaves may or may not be arranged in alignment with each other before fusing. The composite fibers 1301 may be stretched before or after fusing so as to orient the birefringent polymer.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A photonic crystal optical body, comprising:
   a polymer matrix; and
   an arrangement of polymer scattering fibers disposed within the matrix, the scattering fibers being substantially parallel to a first axis, positions of scattering fibers in the arrangement across a cross-section of the polymer matrix being selected so as to form a two-dimensional photonic crystal structure for light incident on the polymer matrix in a direction substantially orthogonal to the first axis.

2. A body as recited in claim 1, wherein the scattering fibers are formed of a first polymer and the matrix is formed of a second polymer, at least one of the first and second polymers being birefringent.

3. A body as recited in claim 2, wherein a refractive index difference between the first and second polymers is greater than 0.05 for light incident on the body in a first polarization state and is less than 0.05 for light incident on the body in a second polarization state orthogonal to the first polarization state.

4. A body as recited in claim 1, wherein at least one of the scattering fibers comprises a disperse phase scattering fiber having a disperse polymer phase in a continuous polymer phase.

5. A body as recited in claim 1, wherein at least a first scattering fiber has a first cross-sectional dimension and at least a second scattering fiber has a second cross-sectional dimension different from the first cross-sectional dimension.

6. A body as recited in claim 1, wherein at least some of the scattering fibers have a cross-sectional dimension in the range 50 nm-1000 nm.

7. A body as recited in claim 6, wherein at least some of the scattering fibers have a cross-sectional dimension in the range 100 nm-500 nm.

8. A body as recited in claim 1, wherein at least some of the scattering fibers have a circular cross-section.

9. A body as recited in claim 1, wherein at least some of the scattering fibers have a non-circular cross-section.

10. A body as recited in claim 9, wherein at least one of the scattering fibers having a non-circular cross-section has a longer cross-sectional direction that is parallel to a longer cross-sectional direction of another of the scattering fibers having a non-circular cross-section.

11. A body as recited in claim 9, wherein at least one of the scattering fibers having a non-circular cross-section has a longer cross-sectional direction that is non-parallel to a longer cross-sectional direction of another of the scattering fibers having a non-circular cross-section.

12. A body as recited in claim 1, wherein at least a first of the scattering fibers has a cross-sectional shape different from a cross-sectional shape of at least a second of the scattering fibers.

13. A body as recited in claim 1, wherein at least one of the scattering fibers comprises a fiber shell surrounding a fiber core.

14. A body as recited in claim 1, wherein the polymer matrix comprises two, substantially parallel, flat major surfaces.

15. A body as recited in claim 1, wherein the polymer matrix comprises at least one structured surface.

16. A body as recited in claim 15, wherein the at least one structured surface comprises a surface that provides optical power to light passing through the structured surface.

17. A body as recited in claim 15, wherein the at least one structured surface comprises a brightness enhancing surface.

18. A body as recited in claim 1, wherein a total cross-sectional area of the scattering fibers comprises at least 1% of the cross-sectional area of the polymer matrix.

19. A body as recited in claim 18, wherein the total cross-sectional area of the scattering fibers comprises at least 10% of the cross-sectional area of the optical element.

20. A body as recited in claim 1, wherein at least a first scattering fiber of the scattering fibers has a substantially uniform cross-sectional dimension along the length of the first scattering fiber.

21. A body as recited in claim 1, wherein at least a first scattering fiber of the scattering fibers has a cross-sectional dimension that varies along the length of the first scattering fiber.

22. A body as recited in claim 21, wherein the cross-sectional dimension of the first scattering fiber has a value of zero at at least one point along the first scattering fiber.

23. An optical system, comprising:
   a photonic crystal comprising an arrangement of polymer scattering fibers within a polymer matrix, the scattering fibers being substantially parallel to a first axis; and
   a light source arranged and configured to generate a light beam incident on the photonic crystal in a direction orthogonal to the first axis.

24. A system as recited in claim 23, wherein at least one of the polymer scattering fibers and polymer matrix being formed of a birefringent material.

25. A system as recited in claim 23, wherein the polymer matrix forms a sheet.

26. A system as recited in claim 23, further comprising surface structure on the polymer matrix.

27. A system as recited in claim 26, wherein the surface structure comprises a surface that provides optical power to the light.

28. A system as recited in claim 26, wherein the surface structure comprises a brightness enhancing surface.

29. A system as recited in claim 23, wherein the fill factor is non-uniform across the photonic crystal.

30. A system as recited in claim 23, wherein the light has a center wavelength of around $\lambda_0$ in vacuum, and at least some of the scattering fibers have a cross-sectional dimension in the range of around $\lambda/10$ to $2\lambda$.

* * * * *

UNITED STATES PATENT AND TRADEMARK OFFICE
CERTIFICATE OF CORRECTION

PATENT NO. : 7,362,943 B2 Page 1 of 1
APPLICATION NO. : 11/068313
DATED : April 22, 2008
INVENTOR(S) : Andrew J. Ouderkirk It is certified that error appears in the above-identified patent and that said Letters Patent is hereby corrected as shown below:

Column 1
Line 9, Delete ";" and insert -- , having attorney docket no. 58959US002; --, therefor.
Line 10, Delete ";" and insert -- , having attorney docket no. 60371US002; --, therefor.
Line 13, Delete ";" and insert -- and having attorney docket no. 60401US002; --, therefor.
Line 15, Delete ";" and insert -- and having attorney docket no. 60622US002; --, therefor.
Line 17, Delete ";" and insert -- and having attorney docket no. 60623US002; --, therefor.

Column 20
Line 20, After "in" delete "a".
Line 44, Delete "." and insert -- , having Attorney Docket No. 60371US002. --, therefor.

Signed and Sealed this

Nineteenth Day of August, 2008

JON W. DUDAS
*Director of the United States Patent and Trademark Office*